United States Patent
Pine

(10) Patent No.: US 9,920,911 B1
(45) Date of Patent: Mar. 20, 2018

(54) EXTERIOR WALL FIXTURE

(71) Applicant: Marc A. Pine, Tampa, FL (US)

(72) Inventor: Marc A. Pine, Tampa, FL (US)

(*) Notice: Subject to any disclaimer, the term of this patent is extended or adjusted under 35 U.S.C. 154(b) by 0 days.

(21) Appl. No.: 15/679,015

(22) Filed: Aug. 16, 2017

Related U.S. Application Data

(60) Provisional application No. 62/380,257, filed on Aug. 26, 2016.

(51) Int. Cl.
| | |
|---|---|
| *F21S 8/00* | (2006.01) |
| *F21V 21/02* | (2006.01) |
| *F21V 23/00* | (2015.01) |
| *F21V 27/02* | (2006.01) |
| *H02G 3/10* | (2006.01) |
| *F21V 31/00* | (2006.01) |
| *F21W 131/10* | (2006.01) |

(52) U.S. Cl.
CPC .............. *F21V 21/02* (2013.01); *F21S 8/033* (2013.01); *F21S 8/037* (2013.01); *F21V 23/002* (2013.01); *F21V 27/02* (2013.01); *F21V 31/00* (2013.01); *H02G 3/105* (2013.01); *F21W 2131/10* (2013.01)

(58) Field of Classification Search
CPC ....................................................... F21S 8/037
See application file for complete search history.

(56) References Cited

U.S. PATENT DOCUMENTS

| | | | | |
|---|---|---|---|---|
| 2,640,670 | A * | 6/1953 | Lampe | F21S 8/037 248/220.1 |
| 2,840,670 | A | 6/1953 | Lampe | |
| 2,694,137 | A * | 11/1954 | Williams | F21S 6/004 248/174 |
| D185,857 | S * | 8/1959 | Elti Chiandussi | D26/80 |
| 2,957,040 | A | 10/1960 | Sharrar | |
| 4,217,629 | A * | 8/1980 | Russell | F21S 8/037 362/147 |
| 4,352,151 | A * | 9/1982 | Lewis | F21S 8/037 362/147 |
| 4,894,758 | A * | 1/1990 | O'Toole | F21S 8/033 362/147 |
| 5,057,980 | A | 10/1991 | Russell | |
| 5,113,328 | A | 5/1992 | Foster et al. | |
| D342,334 | S * | 12/1993 | Vakil | D10/106.8 |

(Continued)

*Primary Examiner* — Hung V Ngo
(74) *Attorney, Agent, or Firm* — Frijouf, Rust & Pyle, P.A.

(57) ABSTRACT

A wall fixture fastened to a corner of a structure that has a first exterior wall and the second exterior wall with a structure non-linear angle. The wall fixture has a first and a second housing wherein, the first and the second housing mourns adjacent to the first and the second exterior wall, respectively. A first and a second electrical device are coupled to the first and second housing, for directing the first and the second electrical device adjacent to the first and second exterior wall, respectively. The first housing has a dividing panel creating a primary chamber and an electrical coupling chamber. An exterior conduit pass is within the first housing for positioning an electrical supplying conductor within the electrical coupling chamber. A first and a second electrical conductor traverse the housing chamber for electrically coupling the electrical devices with the electrical supplying conductor within the electrical coupling chamber.

26 Claims, 18 Drawing Sheets

(56) References Cited

U.S. PATENT DOCUMENTS

| | | | |
|---|---|---|---|
| 5,297,011 A | | 3/1994 | Triunfol |
| 5,349,134 A | * | 9/1994 | Russell .................. F21S 8/033 |
| | | | 174/492 |
| 5,562,340 A | | 10/1996 | Loveli |
| D376,117 S | * | 12/1996 | Kovens ..................... D10/106.6 |
| 5,594,203 A | * | 1/1997 | Veermeer ................ F21S 8/037 |
| | | | 174/492 |
| 5,961,205 A | | 10/1999 | Lovell |
| 6,283,616 B1 | * | 9/2001 | Zoroufy ................. F21S 8/037 |
| | | | 362/147 |
| 7,055,992 B1 | * | 6/2006 | Accornero ............. F21S 8/037 |
| | | | 362/368 |
| 7,726,834 B2 | * | 6/2010 | Senkyr ................... F21S 8/037 |
| | | | 362/217.12 |
| 7,858,878 B2 | * | 12/2010 | Garavuso ............... H02G 3/123 |
| | | | 174/50 |
| 8,193,444 B2 | * | 6/2012 | Rodenberg ............ H02G 3/126 |
| | | | 174/50 |
| 9,445,516 B2 | * | 9/2016 | Dinh ....................... H05K 5/03 |
| 2003/0024171 A1 | * | 2/2003 | Kao ....................... A47B 96/06 |
| | | | 52/27 |

\* cited by examiner

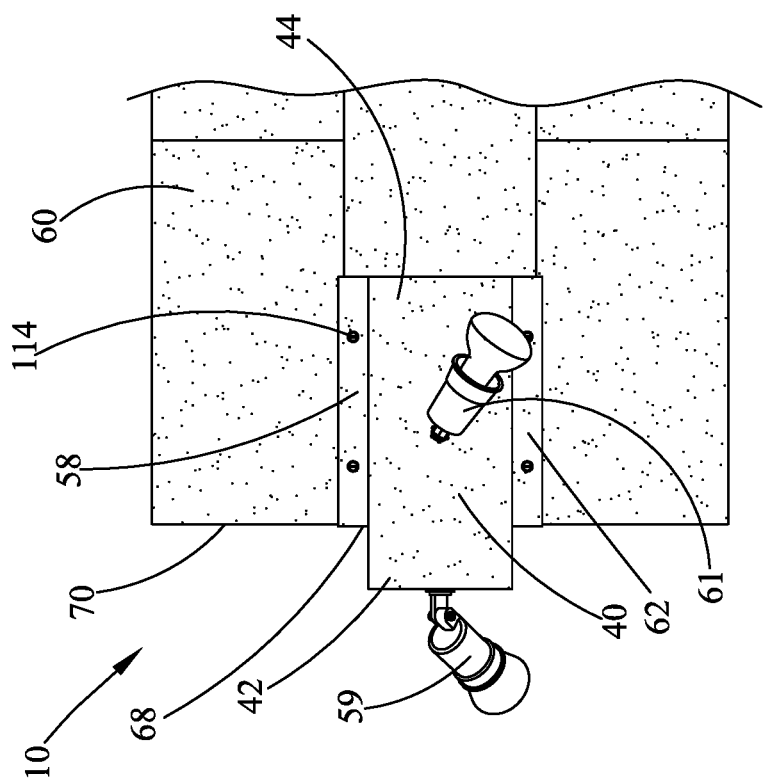
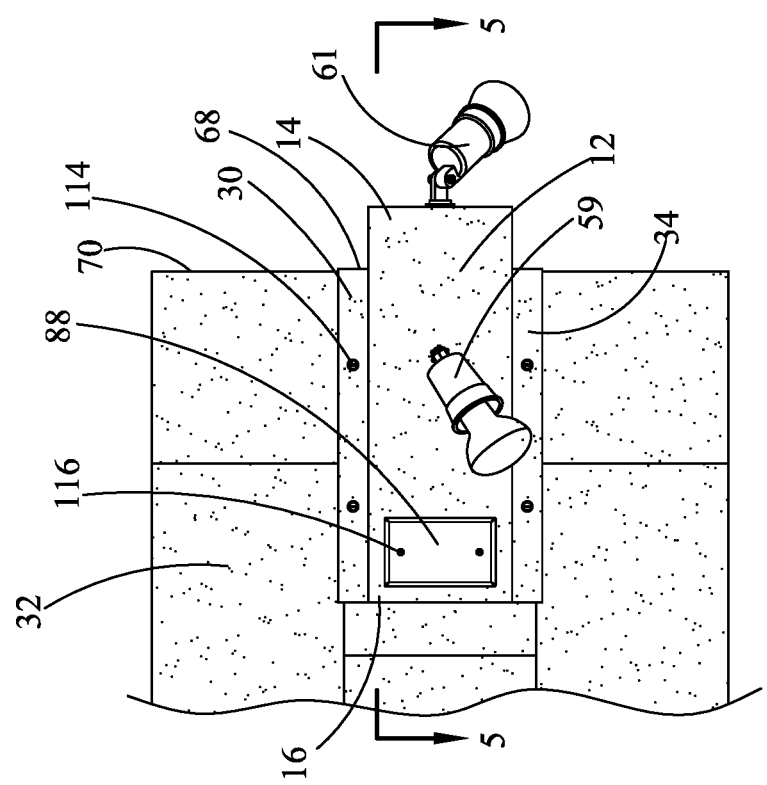

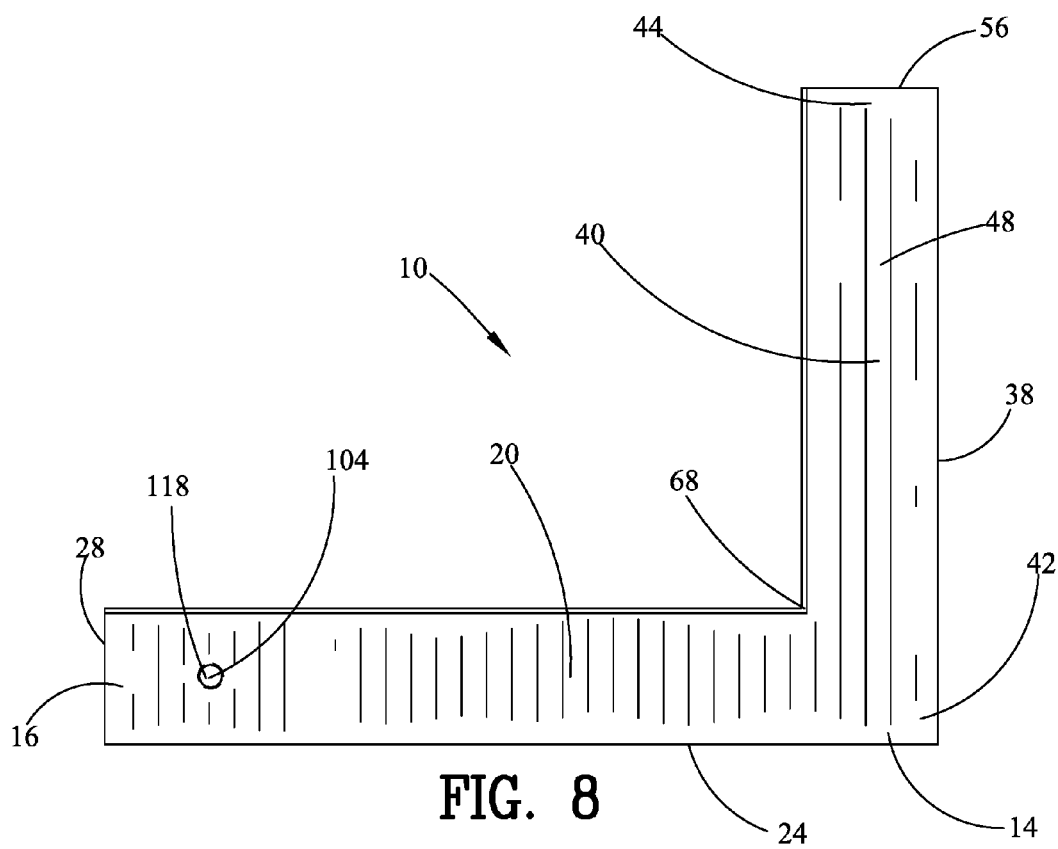
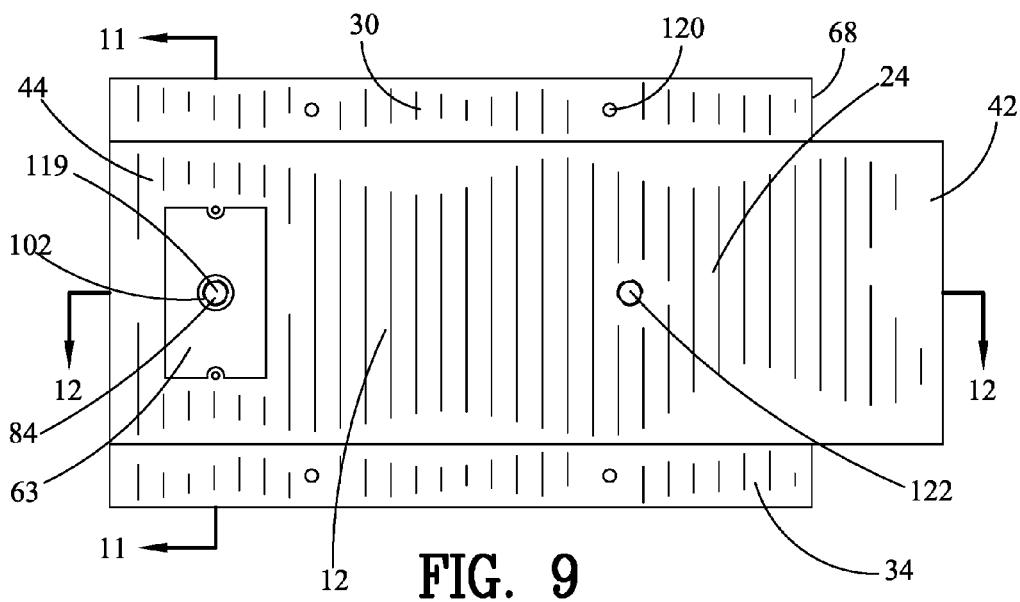

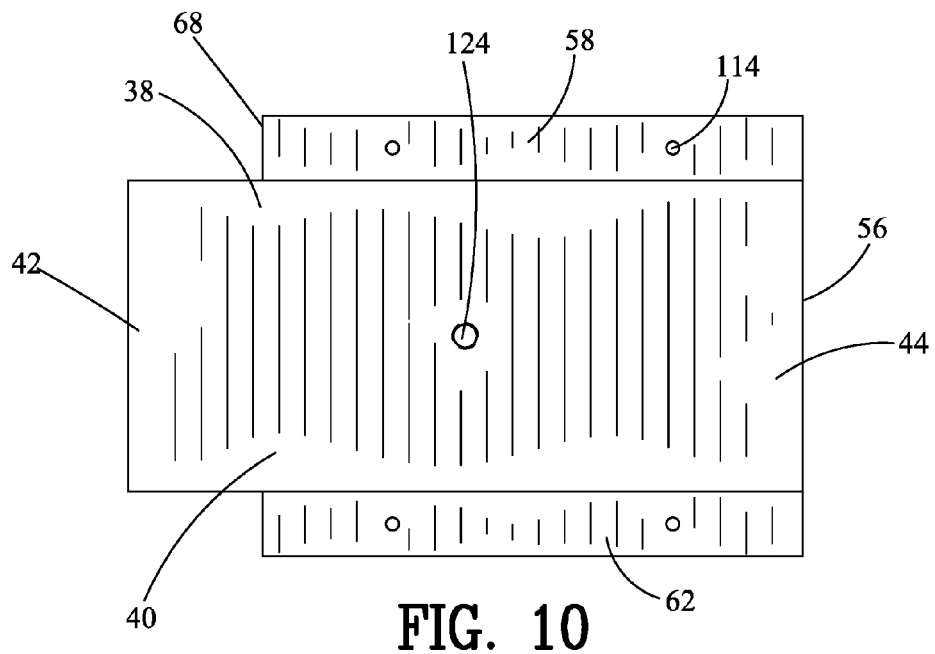
FIG. 10
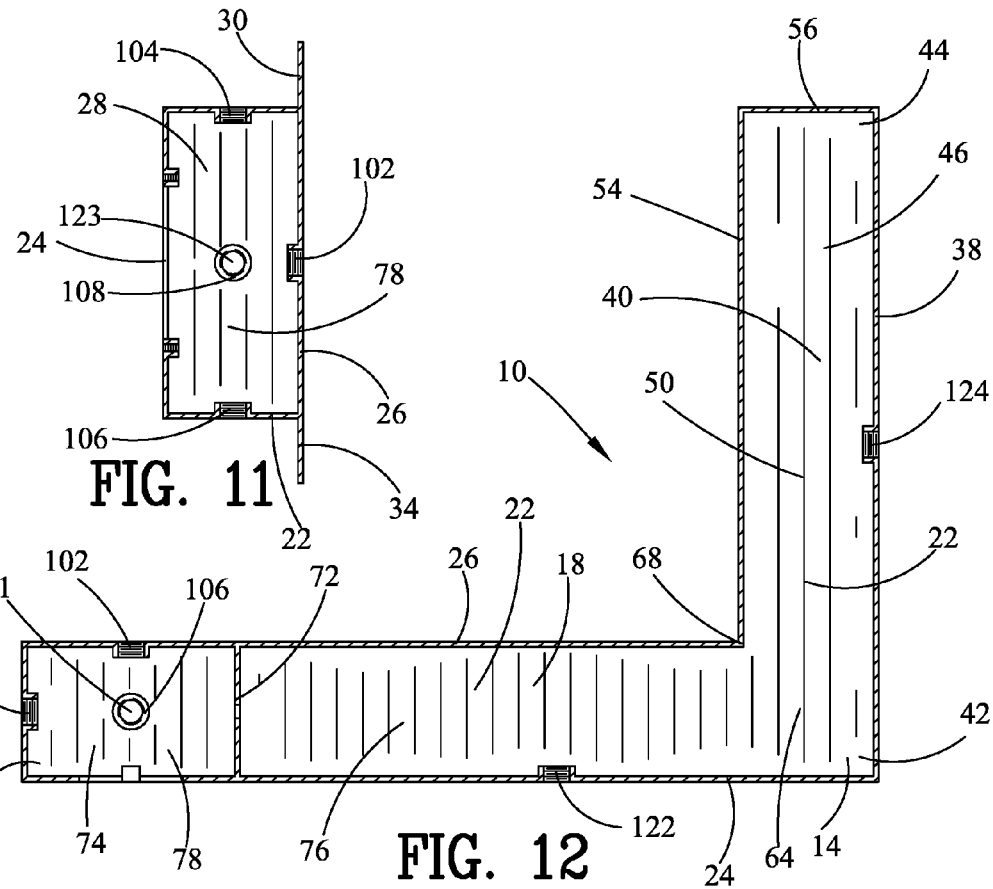
FIG. 11
FIG. 12

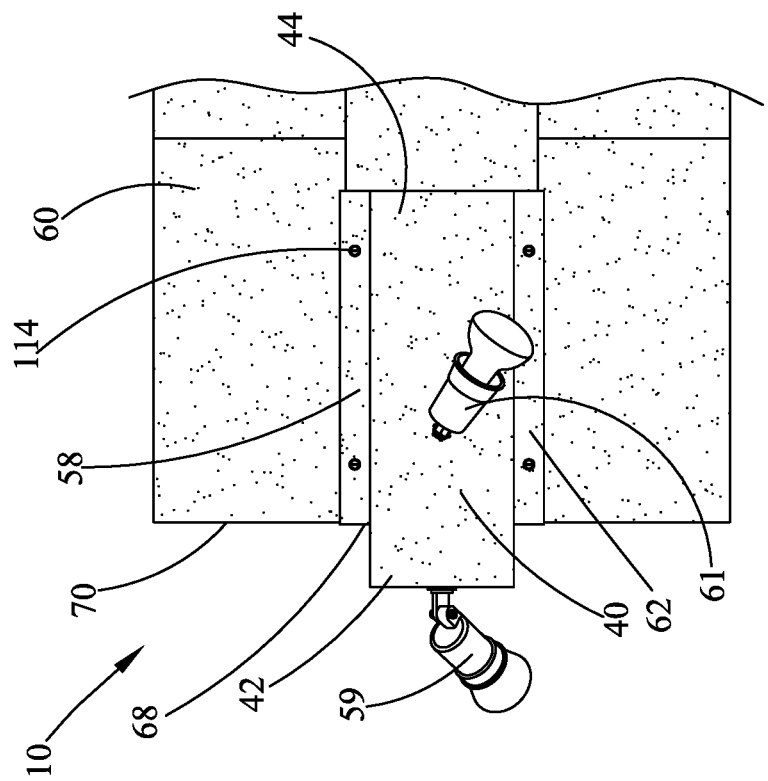
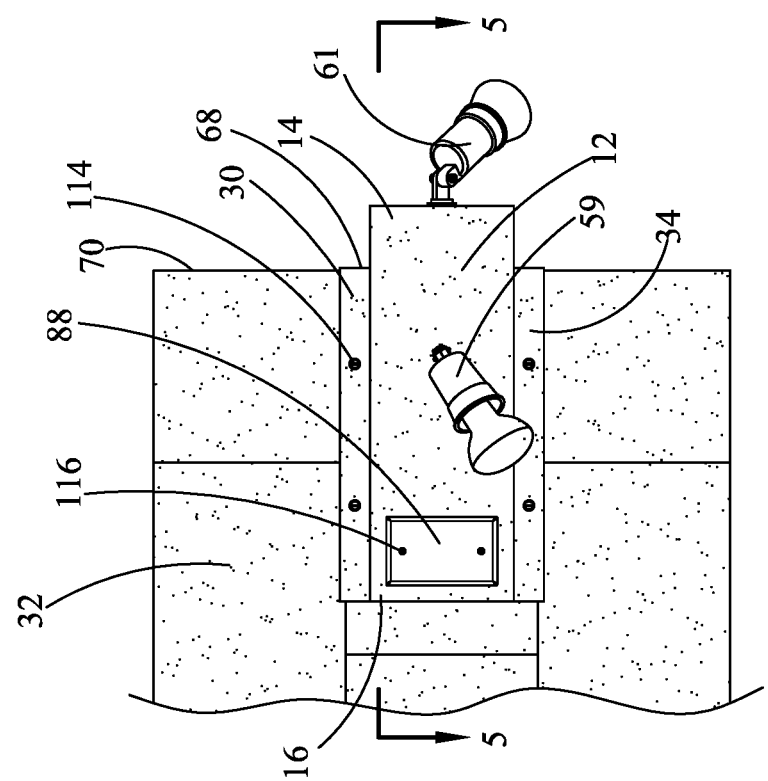

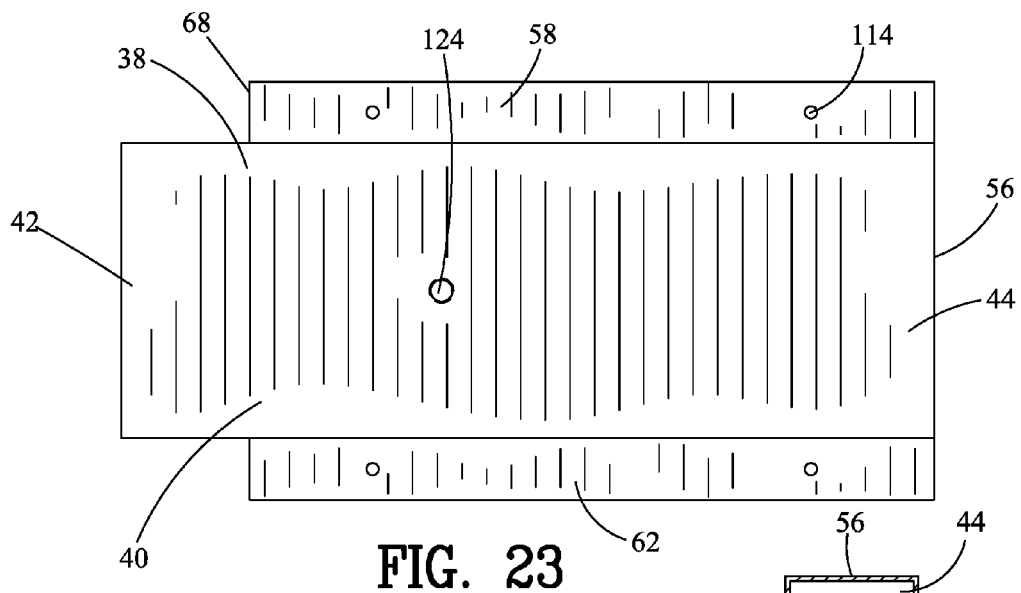
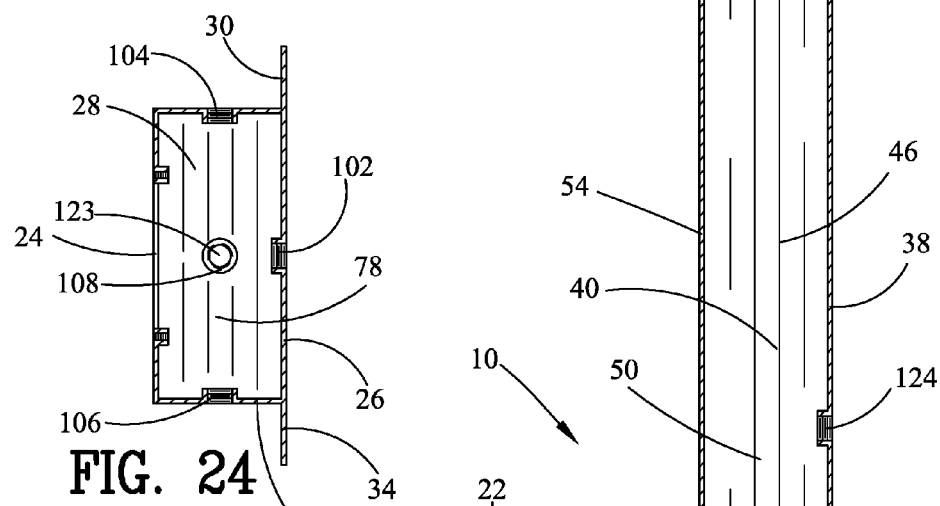
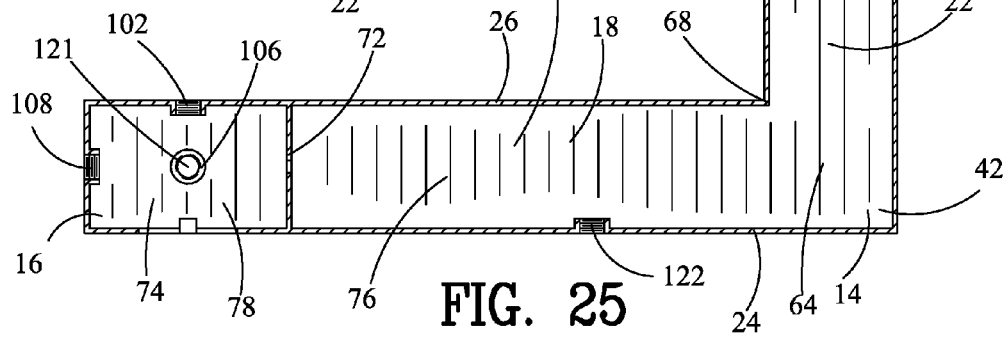

EXTERIOR WALL FIXTURE

FIELD OF THE INVENTION

This invention relates to wall fixture and more particularly to an exterior wall fixture mounted to the corner of a structure.

BACKGROUND OF THE INVENTION

Exterior lighting around commercial and residential building have been common place since the invention of the incandescent light. Today, homeowners and business owners install light fixtures to brighten the exterior of the building or incorporate lighting for decorations. Homeowners and business owners may also add video surveillance cameras, rain meters, motion sensors, and a verity of other outdoor fixtures to their building. Currently, these fixtures are typically mounted separately around the building. Mounting each fixture separately to the side of buildings requires the installer drill holes and run conduits to each outdoor fixture.

Although these mounting techniques are reliable, they require the installer to spend an excessive amount of time to drill holes and run conduits to each outdoor fixture which can also limit the location, and add complexity to the installation. The added complexity to the installation amounts to higher labor costs and more damage to the building by the redundant holes and conduits.

There have been many in the prior art who have attempted to solve these problems with varying degrees of success. None, however completely satisfies the requirements for a complete solution to the aforestated problem. The following U. S. Patents are attempts of the prior art to solve this problem.

U.S. Pat. No. 2,640,670 to Lampe discloses a floodlight having a goose neck, a threaded end portion, and means for removably mounting the floodlight on a corner of a building, said means including a substantially V-shaped bracket comprising a flat bight portion having spaced apertures therein for the reception of fastening elements for securing said bracket on the building corner, said bracket further comprising a marginal flange adapted to seat on the building walls and having vertically aligned notches therein accommodating the apex of the corner, said flange further having openings therein for the passage of conductor wires, and an internally threaded neck on said bight portion between the apertures for receiving said threaded end portion of the goose neck.

U.S. Pat. No. 2,957,040 to Sharrar discloses An exterior wall bracket comprising, in combination, an outlet box, a cylindrical hollow body encasing said outlet box, an inwardly extending flange on one end of said hollow body, openings in said flange permitting the flange to be attached, to said outlet box, two outwardly extending flat wings on said body normal to each other and intersecting in a line normal to the axis of said hollow body, means to attach said flat wings at the corner of a house to the two sides of the house.

U.S. Pat. No. 5,057,980 to Russell discloses a lighting fixture has a self-contained triangular junction box that mounts in the corner of a room or space with the box cover secured as a permanent part of the shadelike lamp housing. The lamp housing has a back panel with a cut-out that slips over the corner mounted junction box, the box cover extending into the housing for registration with the open side of the box when the housing is in place. A single screw joins the box cover to the box and thereby secures the lamp housing thereto.

U.S. Pat. No. 5,113,328 to Foster, et al. discloses A neon tube lighting system, support apparatus and extrusion therefore is described for use in supporting neon tubing along a corner of a support surface. The support assembly preferably comprises an extrusion, a reflector and an elongate lens member. The extrusion has first and second wall members, and an angled base member interconnecting the first and second wall members and including a support, wherein the wall members and the base member form an enclosure having an opening therein between the first and second wall members. Each of said first and second wall members of the extrusion includes an angular member extending into the enclosure towards the angled base member to form a bearing or support surface. The reflector has first and second angular wall members and an intermediate member interconnecting the first and second angular wall members. Each of the first and second angular wall members includes an edge cooperating with the respective bearing surface of the angular member when the reflector is secured to the support to secure the reflector means in the enclosure.

U.S. Pat. No. 5,297,011 to Triunfol discloses a lightable corner guard available for attachment to the protruding corner edge of two adjoining walls. The corner guard utilizes a flexible cover to protect occupants and objects that impact the corner edge. In a preferred embodiment, the corner guard utilizes a microphone amplifying control circuit that is activated upon the receipt of sound from a conventional smoke alarm. The control circuit directing battery voltage to a step-up transformer which in turn energizing flash tubes for illuminating the corner guard and surrounding area. The control circuit includes an oscillator for strobing the flash tubes and a sleep cycle to conserve battery power.

U.S. Pat. No. 5,562,340 to Lovell discloses a light canister for protruding and typically exterior building corners has support brackets, a vertical groove to accommodate the corner, and hooks inside the groove to engage the support bracket. The bracket has two corner contact plates connected by a protruding connection forming a space between the wall and itself when the bracket is attached. The hooks are dimensioned to fit snugly within the space. Both are conveniently V shaped.

U.S. Pat. No. 5,961,205 to Lovell discloses A light canister may be removably mounted either on protruding and typically exterior building corners, or flat walls. A vertical groove accommodates the corner, support brackets and hooks inside the groove to engage the support bracket. The bracket has two corner contact plates connected by a protruding connection forming a space between the wall and itself when the bracket is attached. The hooks are dimensioned to fit snugly within the space and are conveniently V shaped. Spring clips on the canister can engage vertical cylindrical bars fitted to a flat wall, or vice versa. A builtin electrical plug directly engages a wall mounted plug. Triple internal reflectors, two adjustable allow the light to be directed at will.

Although the aforementioned prior art have contributed to the development of the art of an exterior light fixtures for buildings, none of these prior art patents have solved the needs of this art.

Therefore, it is an object of the present invention to provide an exterior light fixture that is easy to install.

Another object of this invention is that it will reduce the time to install lights and other electrical devices.

Another object of this invention is that the installer only needs to drill one hole for multiple electrical devices.

Another object of this invention is that by only requiring one hole to be drilled the possibility of water or bugs getting into the building is lessen.

Another object of this invention is it allows electrical devices to be mounted closer to the corner of the building.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to a wall fixture that mounts to the corner of a residential or commercial building. The residential or commercial building has a first exterior wall and a second exterior wall, the first exterior wall and the second exterior wall having a structure non-linear angle there between and an electrical supplying conductor providing electrical current to the wall fixture.

The wall fixture may be used for mounting outdoor lighting, security cameras, motion detectors, rain meters, or other items or objects. The wall fixture comprises a first housing extending from a proximal end to a distal end defining a first chamber and a second housing extending from a proximal end to a distal end defining a second chamber.

Within the wall fixture, there is a housing coupler for coupling the proximal end of the first housing with the proximal end of the second housing and defining a continuous housing non-linear chamber within the first housing and the second housing. The first housing and the second housing defines a housing non-linear angle therebetween. The housing nonlinear angle and the structure nonlinear angle defining an equivalent angle for positioning the first housing and the second housing adjacent to the first exterior wall and the second exterior wall, respectively. The first housing has a dividing panel for dividing the first chamber into a primary chamber and a secondary chamber. The dividing panel includes an interior conduit pass that allows conductors can traverse the dividing panel. The primary chamber defines an electrical coupling chamber for connecting conductors. The first housing, and more precisely within the electrical coupling chamber, has an exterior conduit pass to bring the electrical supplying conductor into the electrical coupling chamber. The exterior conduit pass has a knock-out for covering the exterior conduit pass temporarily until the insertion of the electrical supply conductor.

For installation, the wall fixture has first housing and second housing which may include an upper mounting panel to aid the installer in mounting the wall fixture to the structure. The electrical coupling chamber has an access aperture for access and connecting the electrical supply conductor with a first and a second electrical conductor. The access aperture allows the fastening of an access aperture cover for sealing the electrical coupling chamber.

A first electrical device is coupled to the first housing for directing the first electrical device adjacent to the first exterior wall and a second electrical device coupled to the second housing for directing the second electrical device adjacent to the second exterior wall. A first electrical conductor traverses the housing non-linear chamber for electrically coupling the first electrical device with the electrical supplying conductor within the electrical coupling chamber; and a second electrical conductor traverses the housing non-linear chamber for electrically coupling the second electrical device with the electrical supplying conductor within the electrical coupling chamber.

Many residential or commercial building have the corner cells poured with concrete, these poured cells create a solid structure at each corner of the building. The first exterior wall and the second exterior wall have a first and a second void adjacent to the solid structure, respectively.

The dimension between the first void and the solid structure defines a first dimension and the dimensions between the second void and the solid structure defines a second dimension. The distance between the exterior conduit pass and the proximal end of the first housing defines a first housing dimension. The first housing dimension is generally commensurate with the first dimension for allowing the electrical supply conductor to traverse the first void, through the exterior conduit pass, and into the electrical coupling chamber. The wall fixture may also be flipped whereas the first housing dimension is generally commensurate with the second dimension for allowing the electrical supply conductor to traverse the second void, through the exterior conduit pass, and into the electrical coupling chamber.

Finally the wall fixture's first and second housing has an upper housing wall, a lower housing wall, an exterior housing wall, an interior wall, and a side housing wall for creating a water tight compartment. The exterior housing walls can have a texture, such as stucco or a wood grain appearance to match or contrast the structure.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 3 is a side view of FIG. 2 showing the first housing mounted to the first exterior wall;

FIG. 4 is a side view of FIG. 2 showing the second housing mounted to the second exterior wall;

FIG. 8 is a top view of the wall fixture;

FIG. 9 is a front view of the first housing with the first electric device and the access aperture cover removed;

FIG. 10 is a front view of the second housing with the second electrical device removed;

FIG. 11 is a sectional view along line 11-11 in FIG. 9;

FIG. 12 is a sectional view along line 12-12 in FIG. 9;

FIG. 16 is a side view of FIG. 15 showing the first housing mounted to the first exterior wall;

FIG. 17 is a side view of FIG. 15 showing the second housing mounted to the second exterior wall;

FIG. 23 is a front view of the second housing with the second electrical device removed;

FIG. 24 is a sectional view along line 24-24 in FIG. 22;

FIG. 25 is a sectional view along line 25-25 in FIG. 22; and

Similar reference characters refer to similar parts throughout the several Figures of the drawings.

DETAILED DISCUSSION

Figure 1:
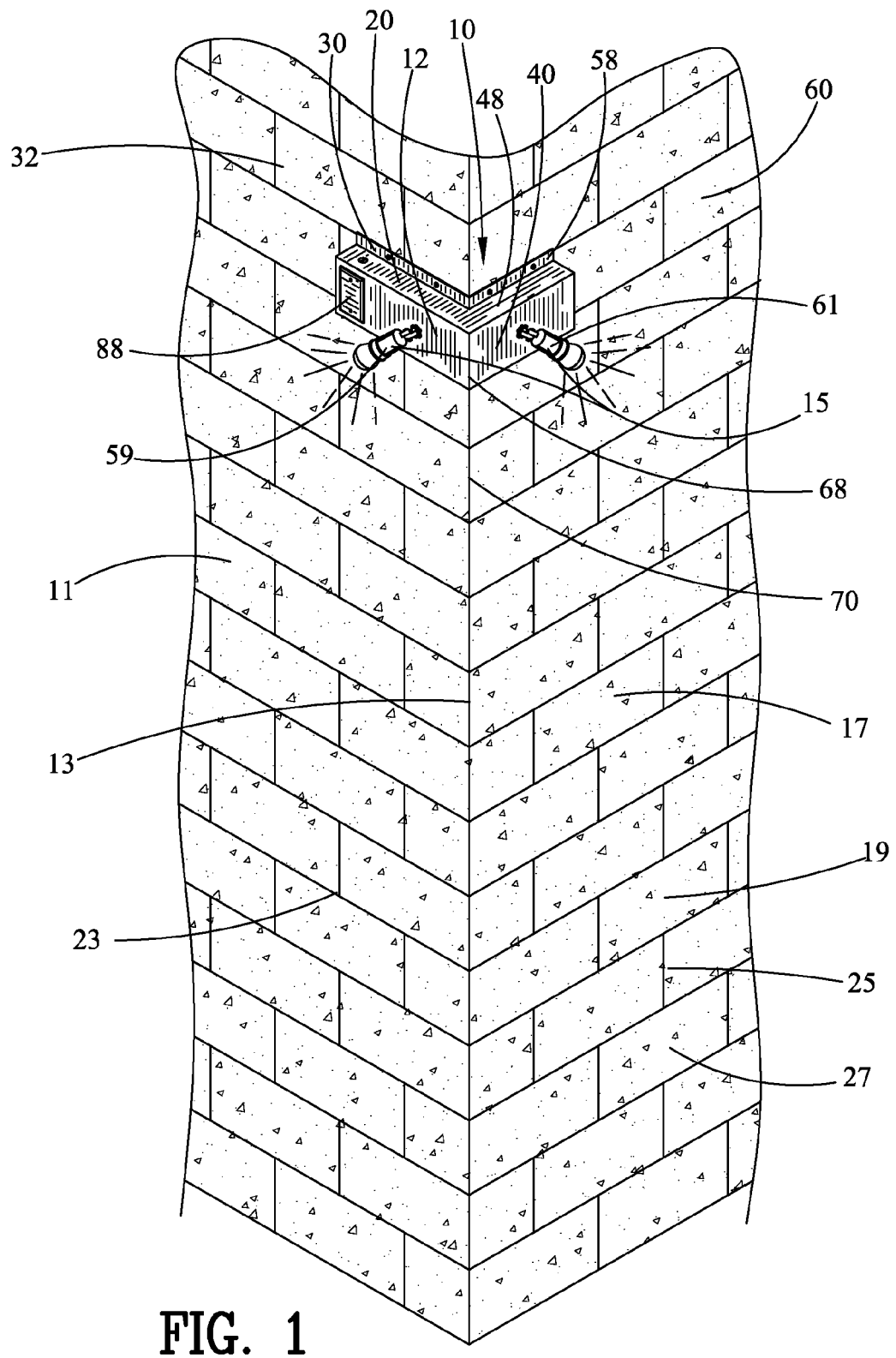
FIG. 1 is a distant view of the present invention mounted to the corner of a structure.

FIG. 1 is an isometric view of the present invention mounted to a concrete structure 11. The present invention, a wall fixture 10, is shown fastened to a corner 13 of a residential or commercial building and having two light emitting devices 15. These light emitting devices 15 are typically used as decoration, lighting walkways or adding security to residential or commercial buildings. Typically, electronic devices such as, light emitting devices 15 are mounted directly to the exterior wall surface 17 in close proximity to a corner 13. Mounting electronic devices, such as, light emitting devices 15 directly to the exterior wall surface 17 has been practiced for many decades to the present.

To understand the present invention completely, a basic understanding of residential and commercial buildings must be understood. The corners 13 of residential and commercial structures have a first exterior wall 32 and a second exterior wall 60 which creates a structure non-linear angle 70 there between. The first exterior wall 32 and the second exterior wall 60 can be constructed using concrete blocks 19. Concrete block 19 structures have been one of the most common and most desired building materials in both residential and commercial buildings. Concrete blocks 19 that are used in a typical residential commercial structure are produced with hollow centers 21 to reduce weight and improve insulation. The hollow centers 21, also known as cores, allow rebar 94 to be inserted and then poured with concrete to provide additional strength to the walls. The concrete blocks 19 are usually installed in a staggered pattern 23 so that the end 25 of one concrete block 19 will line up with the center 27 of the block just above and just below, thereby eliminating any long vertical seams. Having no long vertical seams adds additional strength to the exterior walls. When two exterior walls meet and create a corner 13, many builders and most building codes require that the corner core contain rebar 94 and are poured solid with concrete.

Residential and commercial building owners enjoy the fact that their exterior walls and corners 13 have these additional reinforcements; however the installers of exterior electrical devices, such as, light emitting devices 15 find it challenging and time-consuming to run wires through the reinforced poured cell corners 13.

Figure 2:
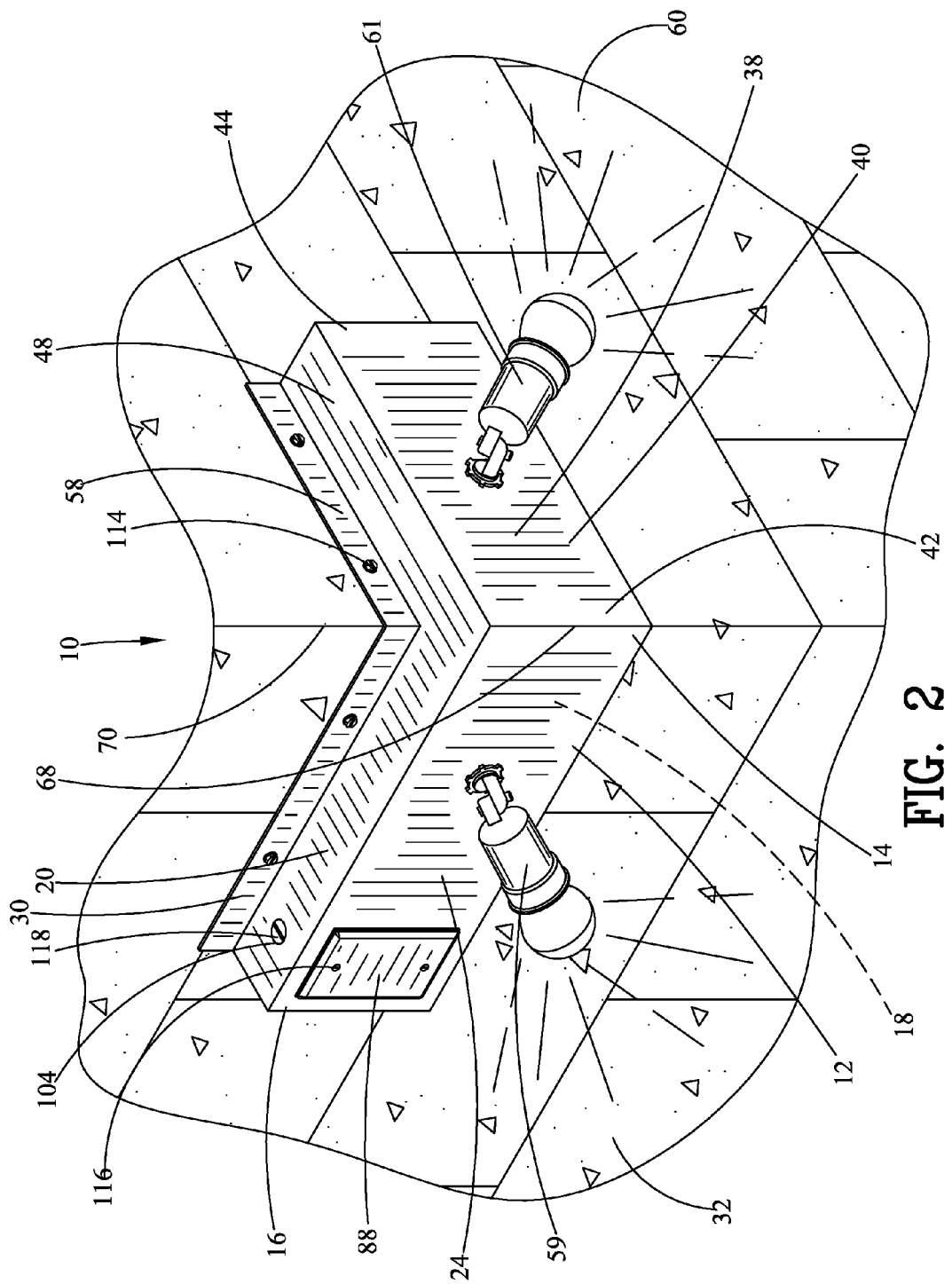
FIG. 2 is a close-up view of the present invention shown in FIG. 1.

FIG. 2 is an enlargement of FIG. 1 showing the wall fixture 10 in better detail. The wall fixture 10 has a first housing 12 which extends from a proximal end 14 to a distal end 16 which defines a first chamber 18.

The first housing 12 has a first upper housing wall 20, a first lower housing wall 22, best shown in FIG. 12, a first exterior housing wall 24, a first interior housing wall 26, best shown in FIG. 12, and a first side housing wall 28, best shown in FIG. 11, for creating a water tight compartment. The first housing 12 has a first upper mounting panel 30 for securing the first housing 12 to the first exterior wall 32. The first housing 12 may also contain a first lower mounting panel 34, best shown in FIG. 11, for securing the first housing 12 to the first exterior wall 32. The first exterior housing wall 24 and the second exterior housing wall 38 may be given a stucco, wood, or any texture that may match or contrast the commercial or residential building. The second housing 40 extending from a proximal end 42 to a distal end 44 and defines a second chamber 46. The second housing 40 has a second upper housing wall 48, a second lower housing wall 50, best shown in FIG. 12, a second exterior housing wall 38, a second interior housing wall 54, best shown in FIG. 12, and a second side housing wall 56, best shown in FIG. 12, for creating a water tight compartment. The second housing 40 has a second upper mounting panel 58 for securing the second housing 40 to the second exterior wall 60. The second housing 40 may also contain a second lower mounting panel 62, best shown in FIG. 10, for securing said second housing 40 to the second exterior wall 60.

FIG. 3 is a front view of the first housing 12. FIG. 3 shows a first electrical device 59, a second electrical device 61 and an access aperture cover 88 in the first housing 12. FIG. 3 also shows the first exterior wall 32.

FIG. 4 is a front view of the second housing 40. FIG. 4 shows a second electrical device 61 and a first electrical device 59. FIG. 4 also shows the second exterior wall 60.

Figure 5:
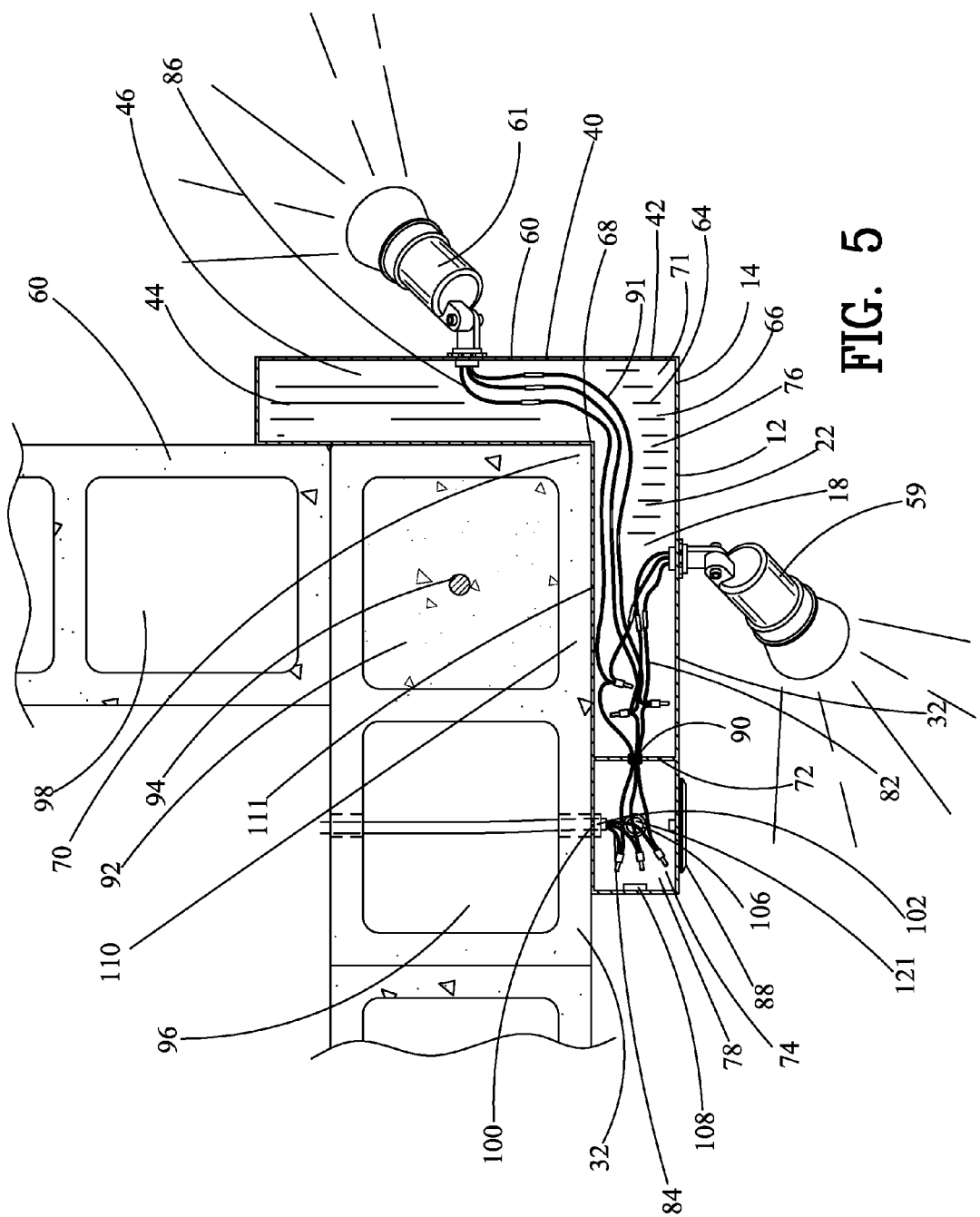
FIG. 5 is sectional view along line 5-5 in FIG. 3.

FIG. 5 is a cross sectional view of the wall fixture 10 from above shown in FIG. 3. FIG. 5 shows the first housing 12 and second housing 40 joining at a housing coupler 64 for coupling the proximal end 14 of the first housing 12 with the proximal end 42 of the second housing 40 and defining a continuous housing non-linear chamber 66 within said first housing 12 and said second housing 40. The first housing 12 and the second housing 40 defines a housing non-linear angle 68 therebetween. The housing nonlinear angle 68 and the structure nonlinear angle 70 defining an equivalent angle 71 for positioning the first housing 12 and said second housing 40 adjacent to the first exterior wall 32 and the second exterior wall 60, respectively.

The first housing 12 contains a dividing panel 72 for dividing the first chamber 18 into a primary chamber 74 and a secondary chamber 76. The primary chamber 74 defines an electrical coupling chamber 78. Within the housing non-linear chamber 66 a first electrical conductor 82 traverses the housing non-linear chamber 66 for electrically coupling the first electrical device 59 with an electrical supplying conductor 84 within the electrical coupling chamber 78. Also within the housing non-linear chamber 66 a second electrical conductor 86 traverses the housing non-linear chamber 66 for electrically coupling the second electrical device 61 with the electrical supplying conductor 84 within the electrical coupling chamber 78.

Figure 19:
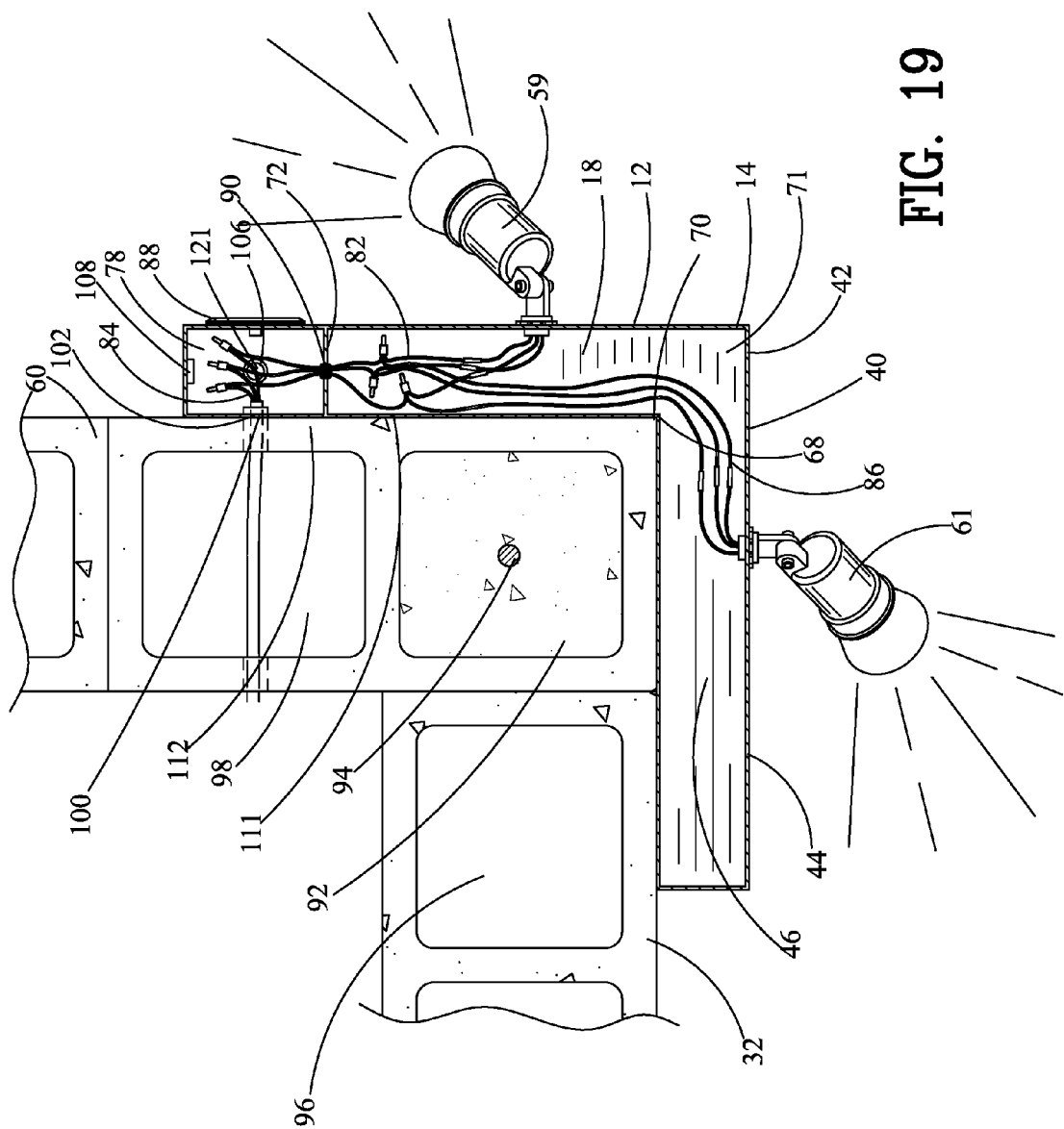
FIG. 19 is a top view similar to FIG. 18, illustrating the wall fixture has been flipped wherein the first housing is mounted to the second exterior wall and the second housing is mounted to the first exterior wall.
Figure 20:
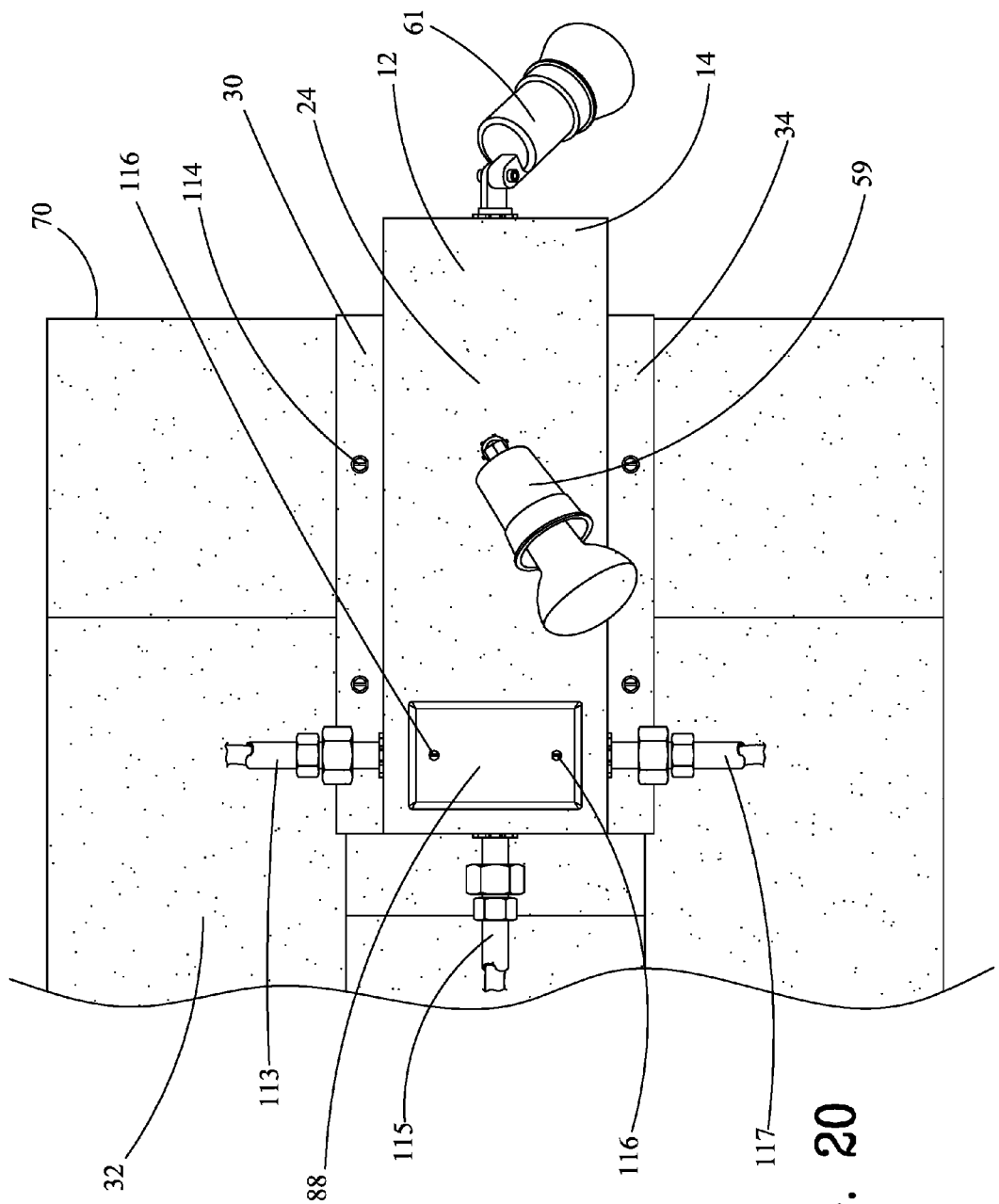
FIG. 20 is a view similar to FIG. 16 illustrating multiple supply conduit connections options.
Figure 21:
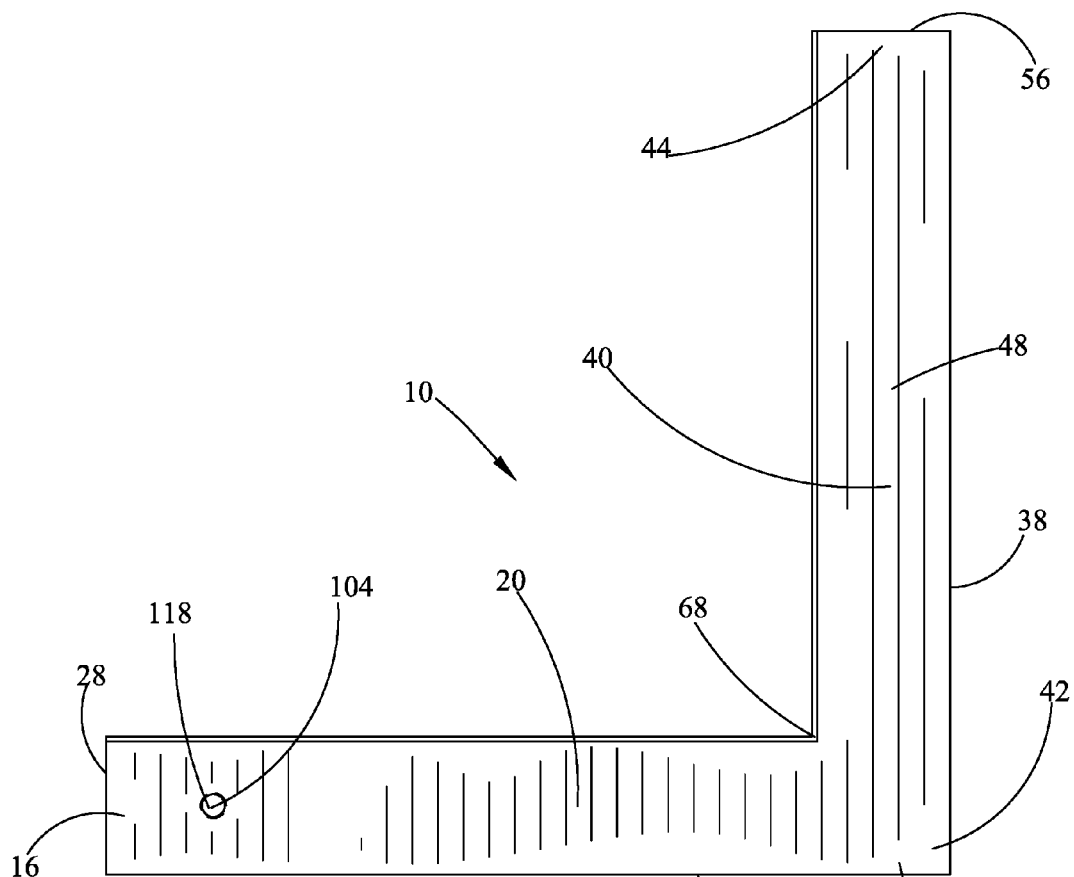
FIG. 21 is a top view of the wall fixture.
Figure 22:
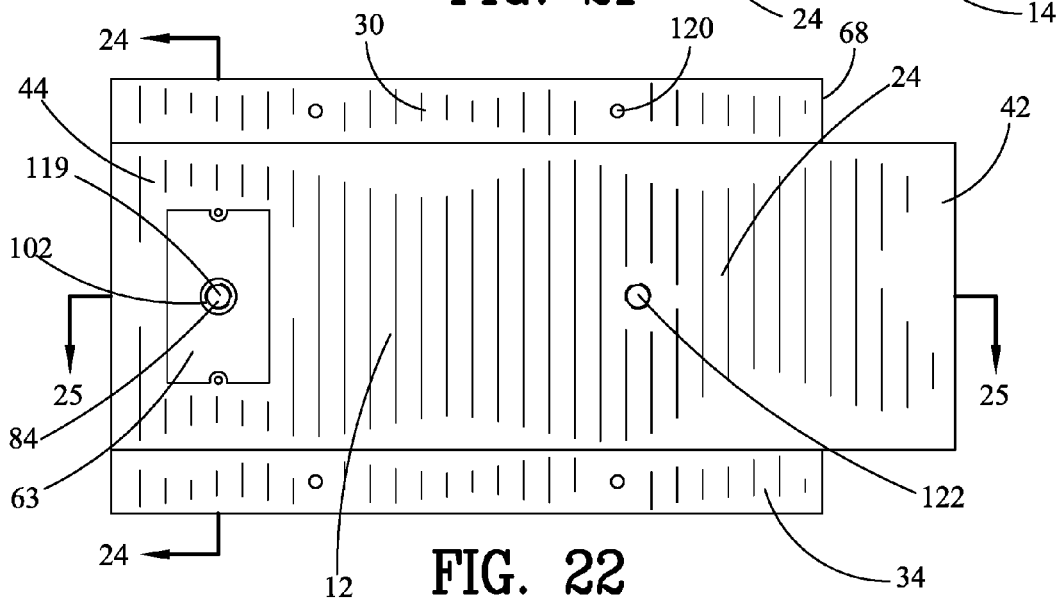
FIG. 22 is a front view of the first housing with the first electric device and the access aperture cover removed.
Figure 26:
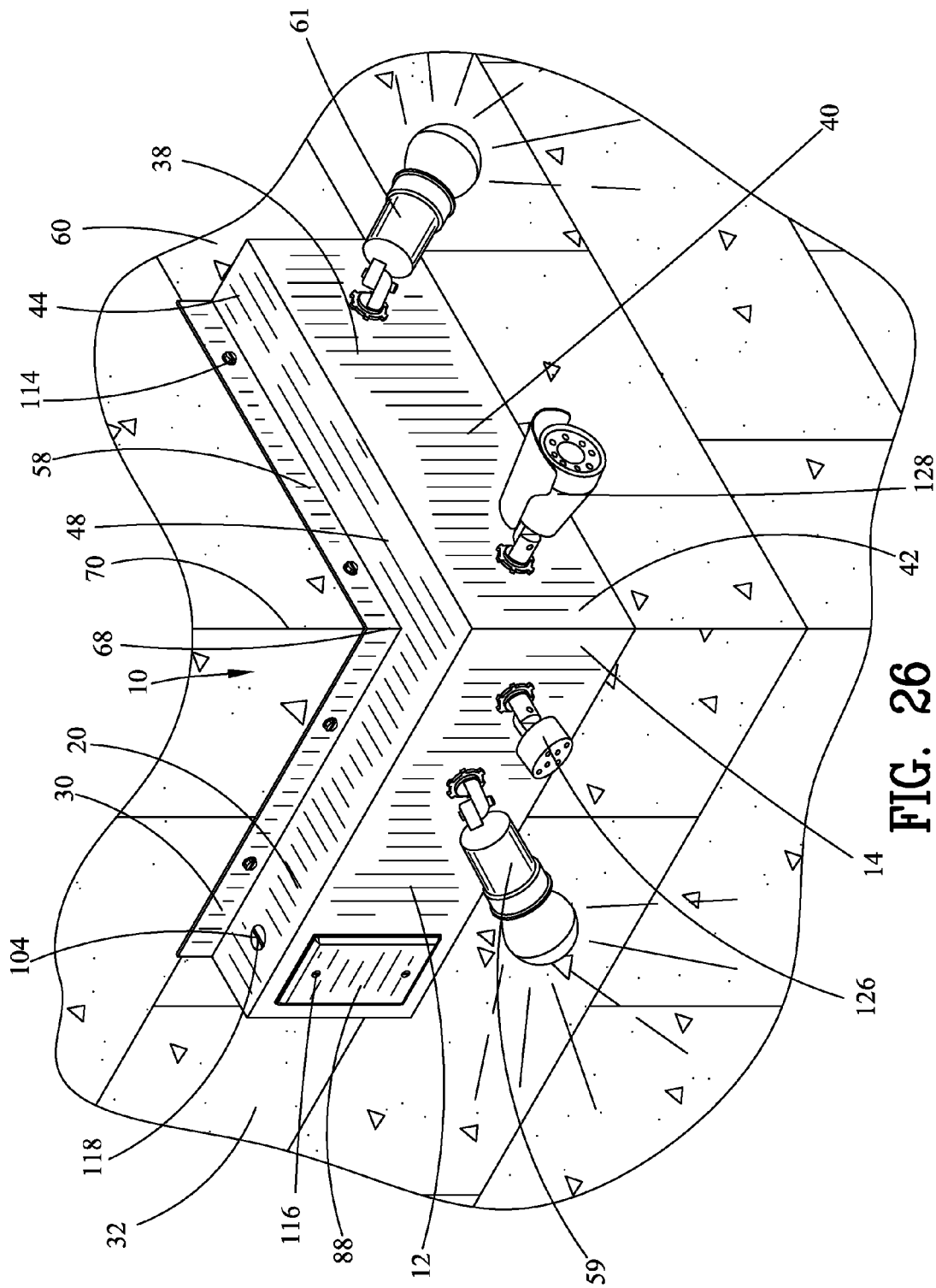
FIG. 26 is a view similar to FIG. 15 illustrating additional electrical devices that can be mounted to the first and second housing.

An access aperture 63, best shown in FIG. 19, is within the first housing 12 and is adjacent to the electrical coupling chamber 78 for accessing and connecting the first electrical conductor 82 and the second electrical conductor 86 to the electrical supply conductor 84. The access aperture 63, best shown in FIG. 9, has an access aperture cover 88 which is primarily used for covering the access aperture 63, best shown in FIG. 9, and sealing the first housing 12.

Within the dividing panel 72 there is an interior conduit pass 90 that allows wires 91 to traverse from the first electrical conductor 82 and the second electrical conductor 86 in to the electrical coupling chamber 78.

More shown in FIG. 5 is the first exterior wall 32, the second exterior wall 60, the solid structure 92, the rebar 94 within the solid structure 92, and the electrical supply conductor 84 that supply current to the wall fixture 10. The solid structure 92 is a corner core cell filled solid concrete. The solid structure 92 is adjacent to both a first void 96 and a second void 98. In the first exterior wall 32, the first void 96 is the ideal location to drill a hole for the electrical supply conductor 84.

A first dimension 110 is defined by the location of the first void 96 and the solid structure 92, and that a first housing dimension 111 is defined by the location of the exterior conduit pass 100 and the proximal end 14 of the first housing 12. The first dimension 110 is generally commensurate with the first housing dimension 111 for allowing the electrical supply conductor 84 to traverse the first void 96, through the exterior conduit pass 100, and into the electrical coupling chamber 78. With the first dimension 110 commensurate with the first housing dimension 11 exterior conduit pass 100 will be positioned adjacent to the first void 96. This exterior conduit pass 100 placement can aid the installer by creating a drilling jig, or can be used for marking the exterior wall 32 so the installer can knowingly drill through the first void 96. After drilling through the first void 96, the installer can route the electrical supply conductor 84 through the first void 96, through the exterior conduit pass 100, and into the electrical coupling chamber 78. The exterior conduit pass 100 can define the inner conduit pass 102, an upper conduit pass 104, best shown in FIG. 8, a lower conduit pass 106, or a side conduit pass 108, best shown in FIG. 12.

Figure 6:
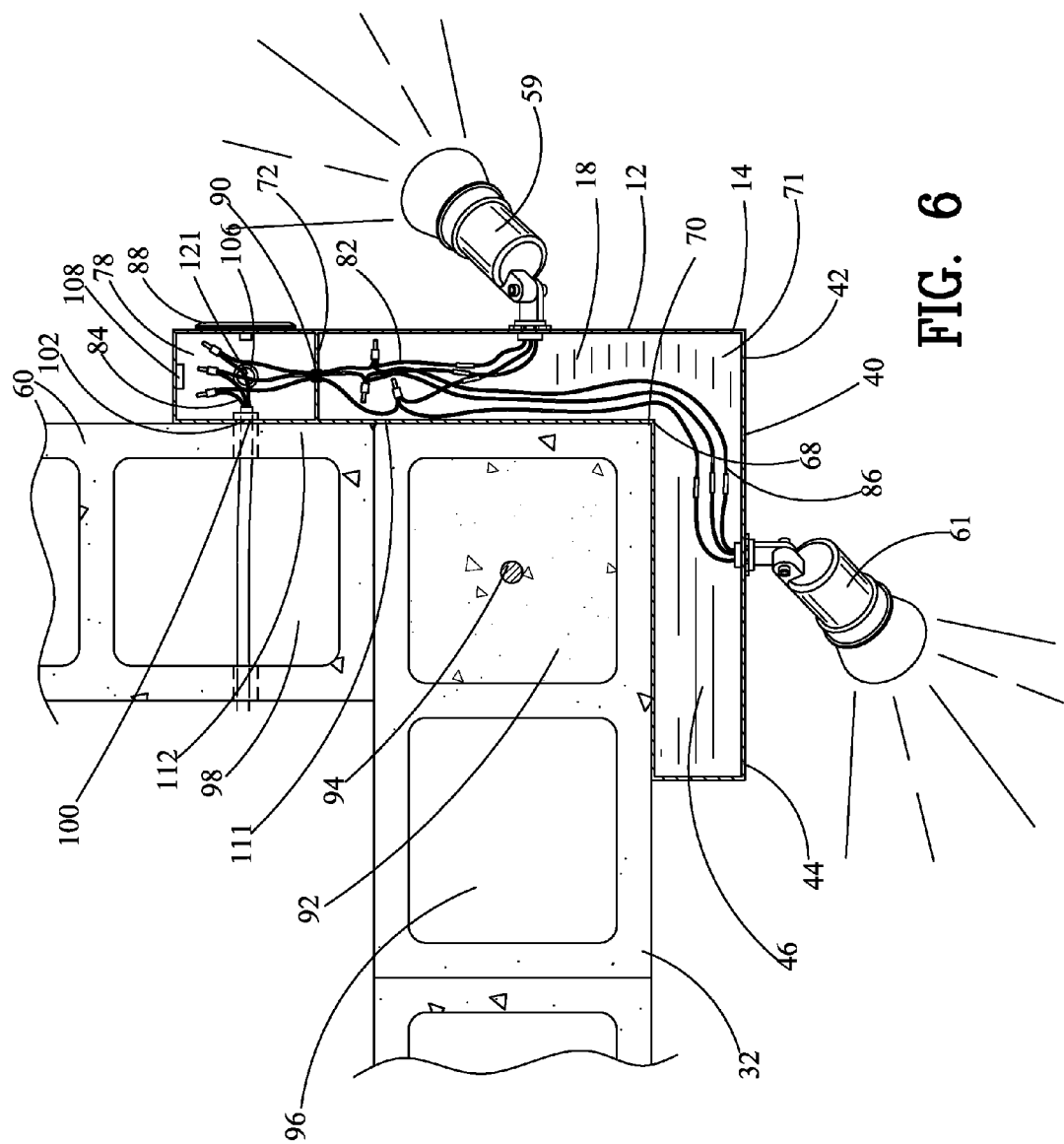
FIG. 6 is a top view similar to FIG. 5, illustrating the wall fixture has been flipped wherein the first housing is mounted to the second exterior wall and the second housing is mounted to the first exterior wall.

FIG. 6 is shows the wall fixture 10 flipped as compared to FIG. 5 and is a cross sectional view of the wall fixture 10 from above wherein the first housing 12 is adjacent to the second exterior wall 60 and the second housing 40 is adjacent to first exterior wall 32. When the wall fixture 10 is flipped the second dimension 112 is defined by the location of the second void 98 and the solid structure 92, and that a first housing dimension 111 is defined by the location of the exterior conduit pass 100 and the proximal end 14 of the first housing 12. The second dimension 112 is generally commensurate with the first housing dimension 111 for allowing the electrical supply conductor 84 to traverse the second void 98, through the exterior conduit pass 100, and into the electrical coupling chamber 78. With the second dimension 112 commensurate with the first housing dimension 111, exterior conduit pass 100 will be positioned adjacent to the second void 98.

The exterior conduit pass 100 placement can aid the installer by creating a drilling jig, or can be used for marking the second exterior wall 60 so the installer can knowingly drill through the second void 98. After drilling through the second void 98, the installer can route the electrical supply conductor 84 through the second void 98, through the exterior conduit pass 100, and into the electrical coupling chamber 78.

Figure 7:
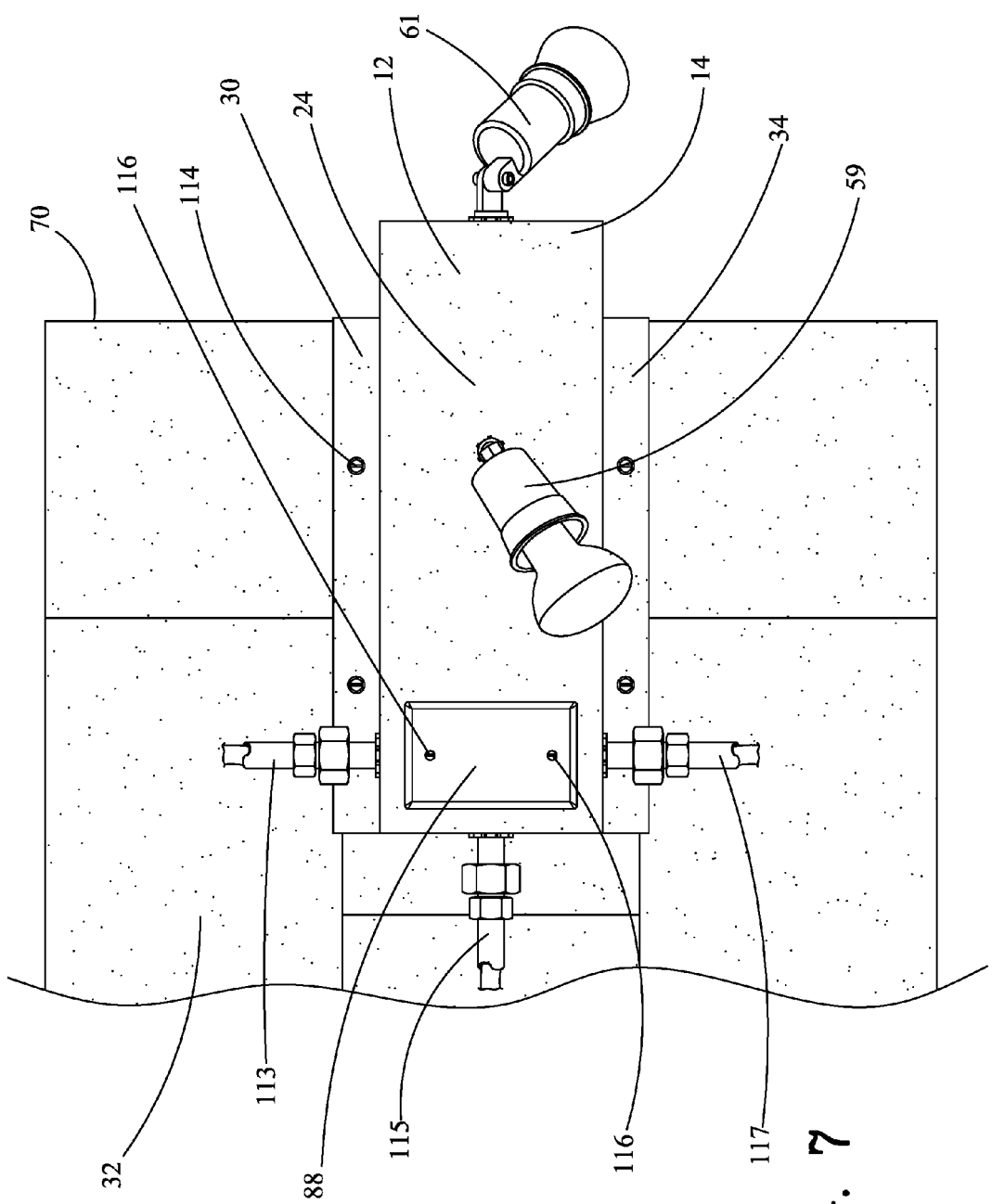
FIG. 7 is a view similar to FIG. 3 illustrating multiple supply conduit connections options.

FIG. 7 is a close up of the wall fixture 10 wherein the first housing 12 is adjacent to exterior wall 32. In addition to showing the first housing 12, FIG. 7 shows the aperture cover 88, the first upper mounting panel 30, the first lower mounting panel 34, the exterior housing wall 24, the first electrical device 59, and the second electrical device 61. FIG. 7 also shows three different possible electrical supply conduits connection locations, those being an upper conduit option 113, a side conduit option 115 and a lower conduit option 117 to route the electrical supply conductor 84. The mounting screws 114 for mounting the wall fixture 10 and aperture cover screws 116 are also shown. The three different possible electrical supply conduits connection locations gives the installer more options for connecting the electrical supplying conductor 84, best shown in FIG. 5, to the wall fixture 10 which will provide electrical current to the wall fixture 10.

FIG. 8 is a top view of the wall fixture 10. Shown in this view is the upper conduit pass 104, the upper knock-out 118 which is used for temporarily covering the upper conduit pass 104 until the insertion of the electrical supply conductor 84, best shown in FIG. 5, in the electrical coupling chamber 78, best shown in FIG. 5. The knock-out 118 may be that which is hammered out or maybe threaded into the upper conduit pass 104 requiring a screw driver or wrench to remove.

FIG. 9 shows the first housing 12 with the removal of both the first electrical device 59, not shown, and the aperture cover 88, not shown. With the aperture cover 88, not shown, removed the inner conduit pass 102 can been seen. The mounting screws 114 are not shown so that the mounting screws apertures 120 can be seen. The mounting screws apertures 120 may contain a sleeve that is constructed with steel, aluminum, stainless steel, or the like, to protect the first upper wall mount 30 and the second upper wall mount 58 in the event the installer over tightens the mounting screws 114, not shown.

FIG. 10 shows the second housing 40 with the removal of the second electrical device 61, not shown. With the second electrical device 61, not shown, removed, the second electrical device mount 124 for the second electrical device 61, not shown, is seen.

FIG. 11 is a sectional view along line 11-11 in FIG. 9. As stated prior the electrical coupling chamber 78 can contain three different possible electrical supply conduits connection locations, such as the upper conduit option 113, best shown in FIG. 7, a side conduit option 115, best shown in FIG. 7, and a lower conduit option 117, best shown in FIG. 7.

The upper conduit option 113, best shown in FIG. 7, is connected to the upper conduit pass 104. The upper conduit pass 104 has an upper knock-out 118 that covering the upper conduit pass 104 temporarily. The side conduit option 115, best shown in FIG. 7, is connected to the side conduit pass 108. The side conduit pass 108 has a side knock-out 123 for covering the side conduit pass 108 temporarily. Finally, the lower conduit option 117, best shown in FIG. 7, is connected to the lower conduit pass 106 and the lower conduit pass 106 has a lower knock-out 121 for covering the lower conduit pass 106 temporarily. The knock-out 212 may be that which is hammered out or maybe threaded into the lower conduit pass 106 requiring a screw driver or wrench to remove. These conduit passes enables the insertion of the various electrical supply conduit in the electrical coupling chamber 78.

FIG. 12 is a sectional view along line 12-12 in FIG. 9. Shown in FIG. 12 are the mounting points for the electrical devices. The first electrical device 59, best shown in FIG. 1, is mounted to the first electrical device mount 122 and the second electrical device 61, best shown in FIG. 1, is mounted to the second electrical device mount 124. Also shown in FIG. 12, is the lower conduit pass 106, side conduit pass 108, and the inner conduit pass 102.

Figure 13:
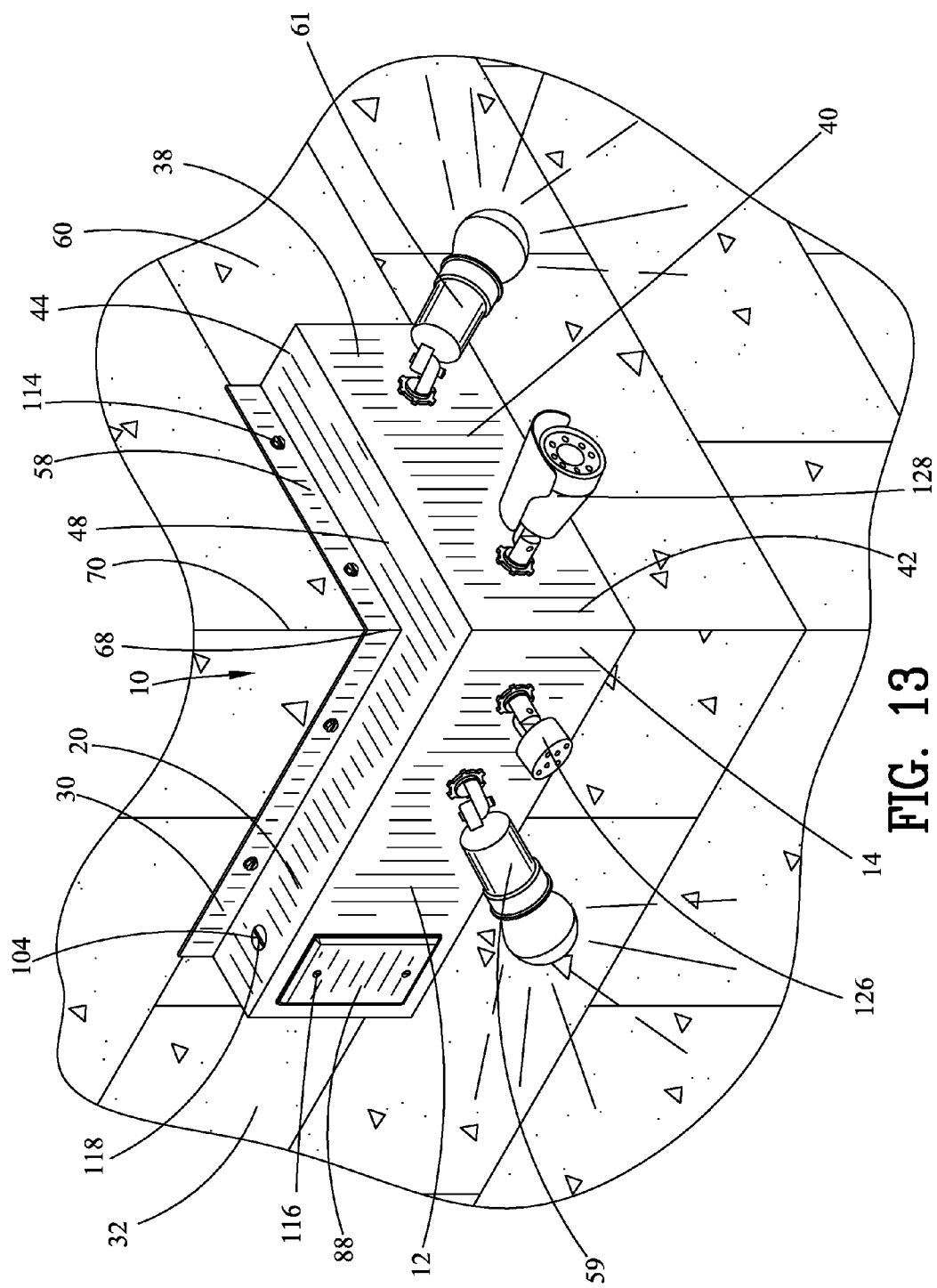
FIG. 13 is a view similar to FIG. 2 illustrating additional electrical devices that can be mounted to the first and second housing.
Figure 14:
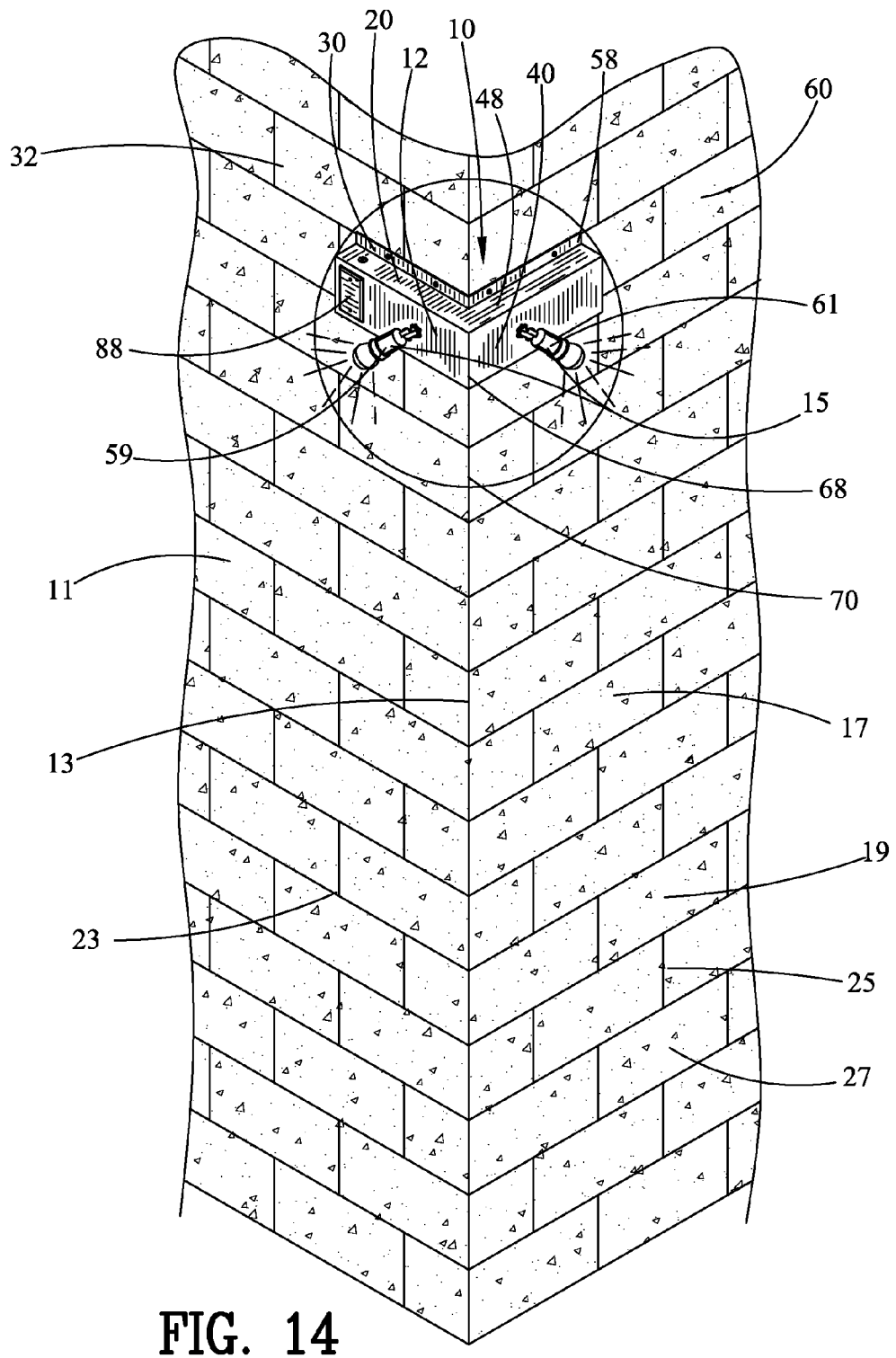
FIG. 14 is a distant view of an second embodiment of the present invention mounted to the corner of a structure.
Figure 15:
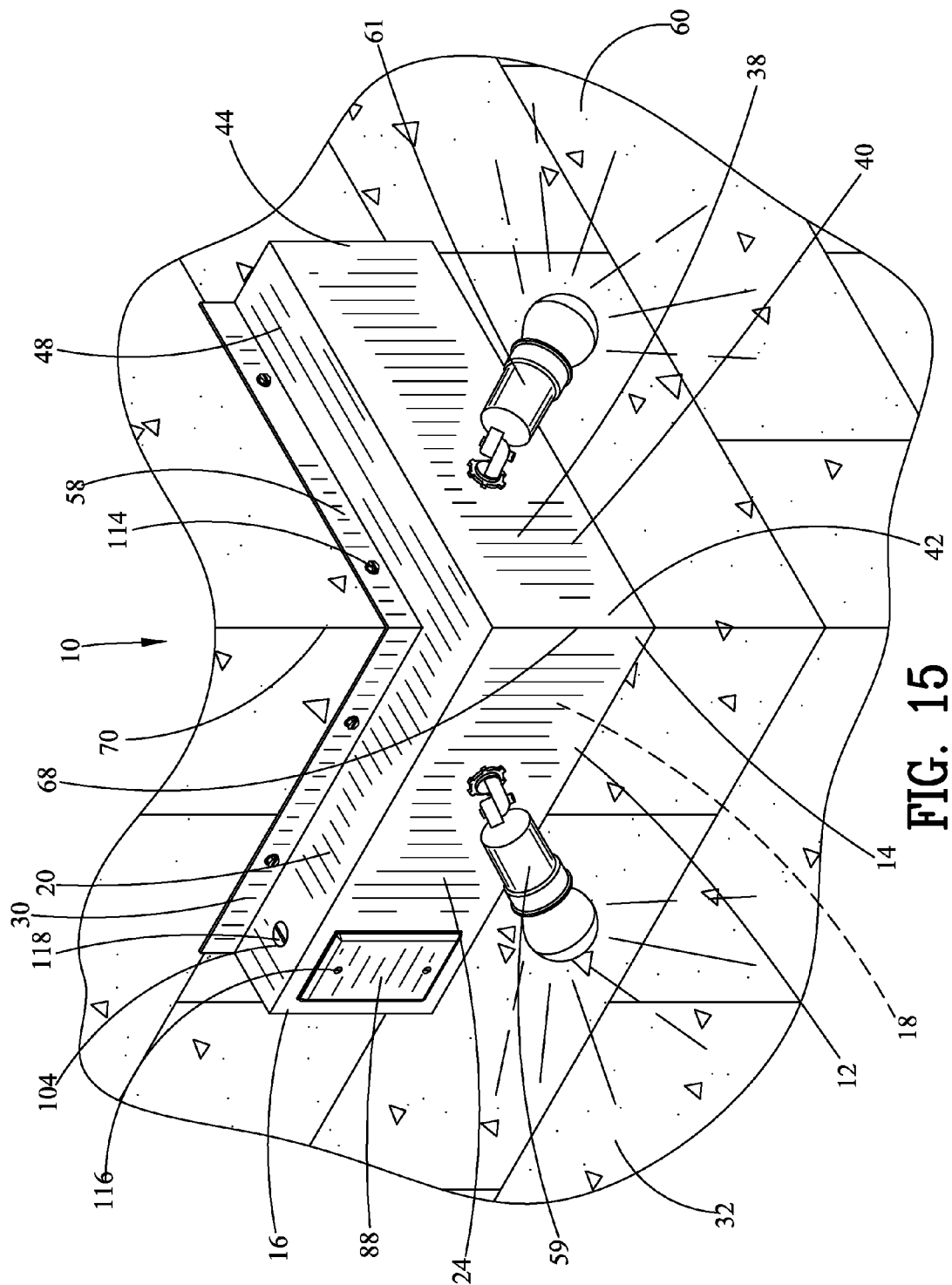
FIG. 15 is a close-up view of the present invention shown in FIG. 14.
Figure 18:
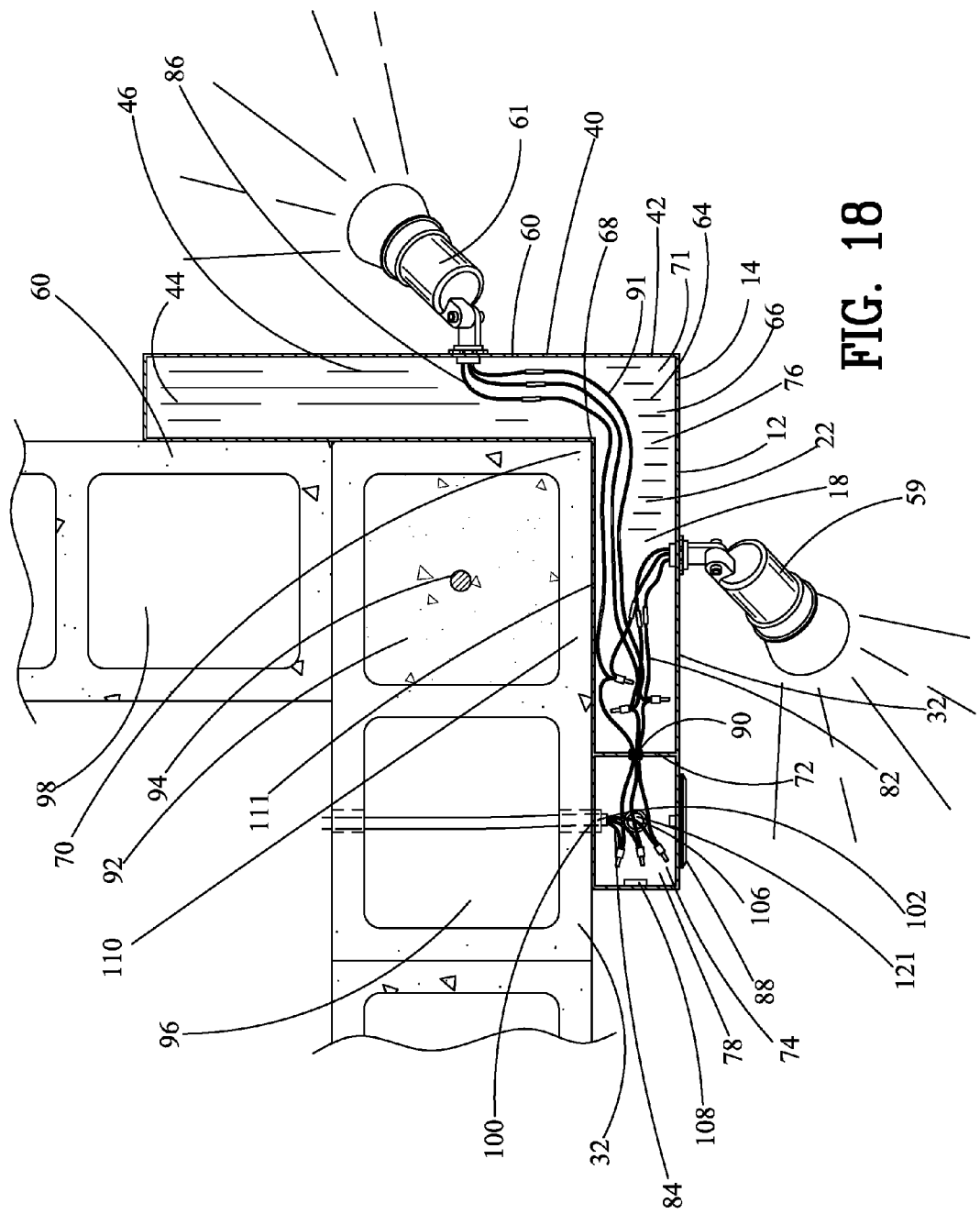
FIG. 18 is sectional view along line 5-5 in FIG. 16.

FIG. 13 is similar to FIG. 2 with the addition of showing additional electrical devices such as a motion sensor 126 and a security camera 128. It is shown that the first electrical device 59 is coupled to the first housing 12 for directing the first electrical device 12 adjacent to the first exterior wall 32; and that the a second electrical device 61 is coupled to the second housing 40 for directing the second electrical device 61 adjacent to the second exterior wall 60.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

FIGS. 14-26 are similar to FIGS. 1-13 with the exception FIGS. 14-26 illustrate the first housing 20 and the second housing 40 having equivalent lengths for aesthetic and symmetry purposes while coupled to the first exterior wall 11 and the second exterior wall 12.

What is claimed is:

1. A wall fixture fastened to a structure, the structure having a first exterior wall and a second exterior wall, the first exterior wall and the second exterior wall having a structure non-linear angle there between, an electrical supply conductor providing electrical current to the wall fixture, the wall fixture comprising;
    a first housing extending from a proximal end to a distal end defining a first chamber;
    a second housing extending from a proximal end to a distal end defining a second chamber;
    a housing coupler for coupling said proximal end of said first housing with said proximal end of said second housing and defining a continuous housing non-linear chamber within said first housing and said second housing;
    said first housing and said second housing defining a housing non-linear angle therebetween;
    said housing nonlinear angle and the structure nonlinear angle defining an equivalent angle for positioning said first housing and said second housing adjacent to the first exterior wall and the second exterior wall, respectively;
    a dividing panel within said first housing for dividing said first chamber into a primary chamber and a secondary chamber;
    said primary chamber defining an electrical coupling chamber;
    an interior conduit pass within said dividing panel;
    an exterior conduit pass within said first housing for positioning the electrical supply conductor with said electrical coupling chamber;
    a first electrical device coupled to said first housing for directing said first electrical device adjacent to the first exterior wall;
    a first electrical conductor traversing said housing non-linear chamber for electrically coupling said first electrical device with the electrical supply conductor within said electrical coupling chamber;
    a second electrical device coupled to said second housing for directing said second electrical device adjacent to the second exterior wall; and
    a second electrical conductor traversing said housing non-linear chamber for electrically coupling said second electrical device with the electrical supply conductor within said electrical coupling chamber.

2. The wall fixture fastened to the structure set forth in claim 1, wherein said electrical conduit pass defines an inner conduit pass in said first housing; and
    an inner knock-out covering said inner conduit pass for temporarily covering said inner conduit pass and being removable for inserting the electrical supply conductor within said electrical coupling chamber.

3. The wall fixture fastened to the structure set forth in claim 1, wherein said electrical conduit pass defines an upper conduit pass in said first housing; and
    an upper knock-out covering said upper conduit pass for temporarily covering said upper conduit pass and being removable for inserting the electrical supply conductor within said electrical coupling chamber.

4. The wall fixture fastened to the structure set forth in claim 1, wherein said electrical conduit pass defines a lower conduit pass in said first housing; and
    a lower knock-out covering said lower conduit pass for temporarily covering said lower conduit pass and being removable for inserting the electrical supply conductor within said electrical coupling chamber.

5. The wall fixture fastened to the structure set forth in claim 1, wherein said electrical conduit pass defines a side conduit pass in said first housing; and
    a side knock-out covering said side conduit pass for temporarily covering said side conduit pass and being removable for inserting the electrical supply conductor within said electrical coupling chamber.

6. The wall fixture fastened to the structure set forth in claim 1, further includes an access aperture in said first housing and adjacent to said electrical coupling chamber for accessing and connecting said first electrical conductor and said second electrical conductor with the electrical supply conductor; and
    an access aperture cover for covering said access aperture and sealing said first housing.

7. The wall fixture fastened to the structure set forth in claim 1, wherein said first housing having a first upper mounting panel for securing said first housing to the first exterior wall; and said second housing having a second upper mounting panel for securing said second housing to the second exterior wall.

8. The wall fixture fastened to the structure set forth in claim 1, wherein said first housing having a first lower mounting panel for securing said first housing to the first exterior wall; and
said second housing having a second lower mounting panel for securing said second housing to the second exterior wall.

9. The wall fixture fastened to the structure set forth in claim 1, wherein said first housing having a first upper housing wall, a first lower housing wall, a first exterior housing wall, a first interior housing wall, and a first side housing wall for creating a water tight compartment; and
said second housing having a second upper housing wall, a second lower housing wall, a second exterior housing wall, a second interior housing wall, and a second side housing wall for creating a water tight compartment.

10. The wall fixture fastened to the structure set forth in claim 1, wherein said first housing having a first upper housing wall, a first lower housing wall, a first exterior housing wall, a first interior wall, and a first side housing wall for creating a water tight compartment;
said second housing having a second upper housing wall, a second lower housing wall, a second exterior wall, a second interior wall, and a second side housing wall for creating a water tight compartment; and
said first exterior housing wall and said second exterior housing wall having a texture.

11. A wall fixture fastened to a structure, the structure having a first exterior wall and a second exterior wall, the first exterior wall and the second exterior wall having a structure non-linear angle there between, an electrical supplying conductor providing electrical current to the wall fixture, the wall fixture comprising;
a first housing extending from a proximal end to a distal end defining a first chamber;
a second housing extending from a proximal end to a distal end defining a second chamber;
a housing coupler for coupling said proximal end of said first housing with said proximal end of said second housing and defining a continuous housing non-linear chamber within said first housing and said second housing;
an inner conduit pass in said first housing for enabling the insertion of the electrical supply conductor in said electrical coupling chamber;
said first housing having a first upper mounting panel for securing said first housing to the first exterior wall;
said second housing having a second upper mounting panel for securing said second housing to the second exterior wall;
said first housing and said second housing defining a housing non-linear angle therebetween;
said housing nonlinear angle and the structure nonlinear angle defining an equivalent angle for positioning said first housing and said second housing adjacent to the first exterior wall and the second exterior wall, respectively;
a dividing panel within said first housing for dividing said first chamber into a primary chamber and a secondary chamber;
said primary chamber defining an electrical coupling chamber;
an interior conduit pass within said dividing panel;
an exterior conduit pass within said first housing for positioning the electrical supplying conductor within said electrical coupling chamber;
a first electrical device coupled to said first housing for directing said first electrical device adjacent to the first exterior wall;
a first electrical conductor traversing said housing non-linear chamber for electrically coupling said first electrical device with the electrical supplying conductor within said electrical coupling chamber;
a second electrical device coupled to said second housing for directing said second electrical device adjacent to the second exterior wall;
a second electrical conductor traversing said housing non-linear chamber for electrically coupling said second electrical device with the electrical supplying conductor within said electrical coupling chamber;
an access aperture in said first housing and adjacent to said electrical coupling chamber for accessing and connecting said first electrical conductor and said second electrical conduit with the electrical supply conductor; and
an access aperture cover for covering said access aperture and sealing said first housing.

12. The wall fixture fastened to the structure set forth in claim 11, wherein said electrical conduit pass defines an upper conduit pass in said first housing;
an upper knock-out covering said upper conduit pass for temporarily covering said upper conduit pass and being removable for inserting the electrical supply conductor within said electrical coupling chamber.

13. The wall fixture fastened to the structure set forth in claim 11, wherein said electrical conduit pass defines a lower conduit pass in said first housing; and
a lower knock-out covering said lower conduit pass for temporarily covering said lower conduit pass and being removable for inserting the electrical supply conductor within said electrical coupling chamber.

14. The wall fixture fastened to the structure set forth in claim 11, wherein said electrical conduit pass defines a side conduit pass in said first housing; and
a side knock-out covering said side conduit pass for temporarily covering said side exterior conduit pass and being removable for inserting the electrical supply conductor within said electrical coupling chamber.

15. The wall fixture fastened to the structure set forth in claim 11, wherein said first housing having a first lower mounting panel for securing said first housing to the first exterior wall; and
said second housing having a second lower mounting panel for securing said second housing to the second exterior wall.

16. The wall fixture fastened to the structure set forth in claim 11, wherein said first housing having a first upper housing wall, a first lower housing wall, a first exterior housing wall, a first interior housing wall, and a first side housing wall for creating a water tight compartment; and
said second housing having a second upper housing wall, a second lower housing wall, a second exterior housing wall, a second interior housing wall, and a second side housing wall for creating a water tight compartment.

17. The wall fixture fastened to the structure set forth in claim 11, wherein said first housing having a first upper housing wall, a first lower housing wall, a first exterior wall, a first interior wall, and a first side housing wall for creating a water tight compartment;

said second housing having a second upper housing wall, a second lower housing wall, a second exterior wall, a second interior wall, and a second side housing wall for creating a water tight compartment; and said first exterior housing wall and said second exterior housing wall having a texture.

18. A wall fixture fastened to a structure, the structure defining a corner between a first exterior wall and a second exterior wall, the corner defining a solid structure, the first exterior wall defining a first void adjacent to the solid structure, the second exterior wall defining a second void adjacent to the solid structure, a first dimension defined between the first void and the solid structure, a second dimension defined between the second void and the solid structure, the first exterior wall and the second exterior wall having a structure non-linear angle there between, the structure having an electrical supplying conductor providing electrical current to the wall fixture, the wall fixture comprising;

a first housing extending from a proximal end to a distal end defining a first chamber;

a second housing extending from a proximal end to a distal end defining a second chamber;

a housing coupler for coupling said proximal end of said first housing with said proximal end of said second housing and defining a housing non-linear chamber;

said first housing and said second housing defining a housing non-linear angle therebetween;

said housing non-linear angle and the structure non-linear angle defining an equivalent angle for positioning said first housing and said second housing adjacent to the first exterior wall and the second exterior wall, respectively;

a dividing panel within said first housing for dividing said first chamber into a primary chamber and a secondary chamber;

said primary chamber defining an electrical coupling chamber;

an interior conduit pass within said dividing panel;

an exterior conduit pass within said first housing for positioning the electrical supplying conductor within said electrical coupling chamber;

a first housing dimension between said exterior conduit pass and said proximal end of said first housing;

said first housing dimension is generally commensurate with the first dimension for allowing the electrical supply conductor to traverse the first void, through said exterior conduit pass, and into said electrical coupling chamber;

a first electrical device coupled to said first housing;

a first electrical conductor traversing said housing non-linear chamber for electrically coupling said first electrical device with the electrical supplying conductor within said electrical coupling chamber;

a second electrical device coupled to said second housing;

a second electrical conductor traversing said housing non-linear chamber for electrically coupling said second electrical device with the electrical supplying conductor within said electrical coupling chamber; and said electrical coupling chamber having an access aperture for accessing and connecting said first electrical conductor and said second electrical conductor with the electrical supply conductor.

19. The wall fixture fastened to the structure set forth in claim 18, wherein said electrical conduit pass defines an inner conduit pass in said first housing; and an inner knock-out covering said inner conduit pass for temporarily covering said inner conduit pass and being removable for inserting the electrical supply conductor within said electrical coupling chamber.

20. The wall fixture fastened to the structure set forth in claim 18, wherein said electrical conduit pass defines an upper conduit pass in said first housing; and an upper knock-out covering said upper conduit pass for temporarily covering said upper conduit pass and being removable for inserting the electrical supply conductor within said electrical coupling chamber.

21. The wall fixture fastened to the structure set forth in claim 18, wherein said electrical conduit pass defines a lower conduit pass in said first housing; and a lower knock-out covering said lower conduit pass for temporarily covering said lower conduit pass and being removable for inserting the electrical supply conductor within said electrical coupling chamber.

22. The wall fixture fastened to the structure set forth in claim 18, wherein said electrical conduit pass defines a side conduit pass in said first housing; and a side knock-out covering said side conduit pass for temporarily covering said side conduit pass and being removable for inserting the electrical supply conductor within said electrical coupling chamber.

23. The wall fixture fastened to a structure as set forth in claim 18, wherein said first housing having a first upper mounting panel for securing said first housing to the first exterior wall; and said second housing having a second upper mounting panel for securing said second housing to the second exterior wall.

24. The wall fixture fastened to a structure as set forth in claim 18, wherein said first housing having a first lower mounting panel for securing said first housing to the first exterior wall; and said second housing having a second lower mounting panel for securing said second housing to the second exterior wall.

25. The wall fixture fastened to the structure set forth in claim 18, wherein said first housing having a first upper housing wall, a first lower housing wall, a first exterior wall, a first interior wall, and a first side housing wall for creating a water tight compartment; and said second housing having a second upper housing wall, a second lower housing wall, a second exterior wall, a second interior wall, and a second side housing wall for creating a water tight compartment.

26. The wall fixture fastened to a structure set forth in claim 18, wherein said first housing dimension is generally commensurate with the second dimension for allowing the electrical supply conductor to traverse the second void, through said exterior conduit pass, and into said electrical coupling chamber.

* * * * *